(12) United States Patent
Iwamura et al.

(10) Patent No.: US 7,424,128 B2
(45) Date of Patent: Sep. 9, 2008

(54) ELECTRONIC WATERMARK EMBEDDING APPARATUS, ELECTRONIC WATERMARK EMBEDDING METHOD, RECORD MEDIUM HAVING ELECTRONIC WATERMARK AND MANUFACTURING METHOD OF RECORD MEDIUM

(75) Inventors: Hiroshi Iwamura, Tokorozawa (JP); Yoshiaki Moriyama, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 675 days.

(21) Appl. No.: 10/409,685

(22) Filed: Apr. 9, 2003

(65) Prior Publication Data
US 2004/0022412 A1 Feb. 5, 2004

(30) Foreign Application Priority Data
Apr. 10, 2002 (JP) ............................. P2002-107916
May 15, 2002 (JP) ............................. P2002-139933
May 16, 2002 (JP) ............................. P2002-142009
May 24, 2002 (JP) ............................. P2002-150224

(51) Int. Cl.
*H04K 1/00* (2006.01)

(52) U.S. Cl. .................................................. 382/100
(58) Field of Classification Search ............... 382/100, 382/232; 380/210, 287, 54; 713/176; 348/461, 348/467
See application file for complete search history.

(56) References Cited

U.S. PATENT DOCUMENTS

| 6,061,793 | A | 5/2000 | Tewfik et al. ............... 713/176 |
| 6,415,041 | B1 * | 7/2002 | Oami et al. ................. 382/100 |
| 6,584,210 | B1 * | 6/2003 | Taguchi et al. ............... 382/100 |
| 6,603,864 | B1 * | 8/2003 | Matsunoshita ............... 382/100 |
| 6,738,495 | B2 * | 5/2004 | Rhoads et al. ............... 382/100 |
| 6,975,743 | B2 * | 12/2005 | Venkatesan et al. ......... 382/100 |
| 2002/0087864 | A1 * | 7/2002 | Depovere et al. ............ 713/176 |

(Continued)

FOREIGN PATENT DOCUMENTS

EP 0 967 803 A2 12/1999

(Continued)

OTHER PUBLICATIONS

Kankanhalli et al., "Adaptive Visible Watermarking of Images," Proc. IEEE Int. Conf. on Multimedia Computing and Systems, Jun. 1999, pp. 568-573.*

(Continued)

*Primary Examiner*—Andrew W Johns
(74) *Attorney, Agent, or Firm*—Sughrue Mion, PLLC

(57) ABSTRACT

An object of the present invention is to provide an electronic watermark embedding apparatus, an electronic watermark embedding method, a record medium having an electronic watermark capable of securely detecting the watermark in the case of performing the noise reduction process or data compression process to the information on the contents and a manufacturing method of record medium. The electronic watermark embedding apparatus is provided with an embedding device for embedding an electronic watermark comprised of a signal generated based on a predetermined rule into contents comprised of digital information; a variation device for varying intensity of the electronic watermark to be embedded into the contents; and a controlling device for controlling the variation device so as to change the intensity of the electronic watermark, and wherein the controlling device for controlling the variation means so as to increase the intensity of the electronic watermark at intervals are provided.

21 Claims, 23 Drawing Sheets

U.S. PATENT DOCUMENTS

2003/0012404 A1* 1/2003 Matsumura et al. ......... 382/100
2003/0179905 A1* 9/2003 Inoue et al. ................ 382/100

FOREIGN PATENT DOCUMENTS

| EP | 1 006 710 A2 | 6/2000 |
|----|---|---|
| EP | 1 006 722 A2 | 6/2000 |
| EP | 1 006 730 A2 | 6/2000 |
| JP | 11-346302 A | 12/1999 |
| JP | 11-355736 A | 12/1999 |
| JP | 2000-173175 A | 6/2000 |
| JP | 2001-045264 A | 2/2001 |
| JP | 2001-203992 A | 7/2001 |
| WO | WO99/01980 A1 | 1/1999 |
| WO | WO 99/18723 A1 | 4/1999 |
| WO | WO 01/28230 A1 | 4/2001 |
| WO | WO 01/71960 A1 | 9/2001 |
| WO | WO 02/23905 A1 | 3/2002 |
| WO | WO 02/39383 A2 | 5/2002 |

OTHER PUBLICATIONS

Lie et al., "Data Hiding In Images With Adaptive Number Of Least Significant Bits Based On The Human Visual System," Proc. IEEE Int. Conf. on Image Processing, vol. I, Oct. 1999, pp. 286-290.*

Japanese Abstract No. 11346302, dated Dec. 14, 1999.

Chou C-H et al:, "A Perceptually Tuned Subband Image Coder Based on the Measure of Just-Noticeable-Distortion Profile", IEEE Transactions on Circuits and Systems for Video Technology, IEEE Inc. New York, US, vol. 5, No. 6, Dec. 1, 1995, pp. 467-476, XP000545953.

Nikolaidis N et al:, "Robust Image Watermarking in the Spatial Domain", Signal Processing, Elsevier Science Publishers B.V. Amsterdam, NL, vol. 66, No. 3, May 28, 1998, pp. 385-403, XP004124959.

Japanese Abstract No. 11285836, dated Oct. 19, 1999.

Hartung F et al:, "Watermarking of uncompressed and compressed video", Signal Processing, Elsevier Science Publishers B.V. Amsterdam, NL, vol. 66, No. 3, May 28, 1998, pp. 283-301, XP004124953.

* cited by examiner

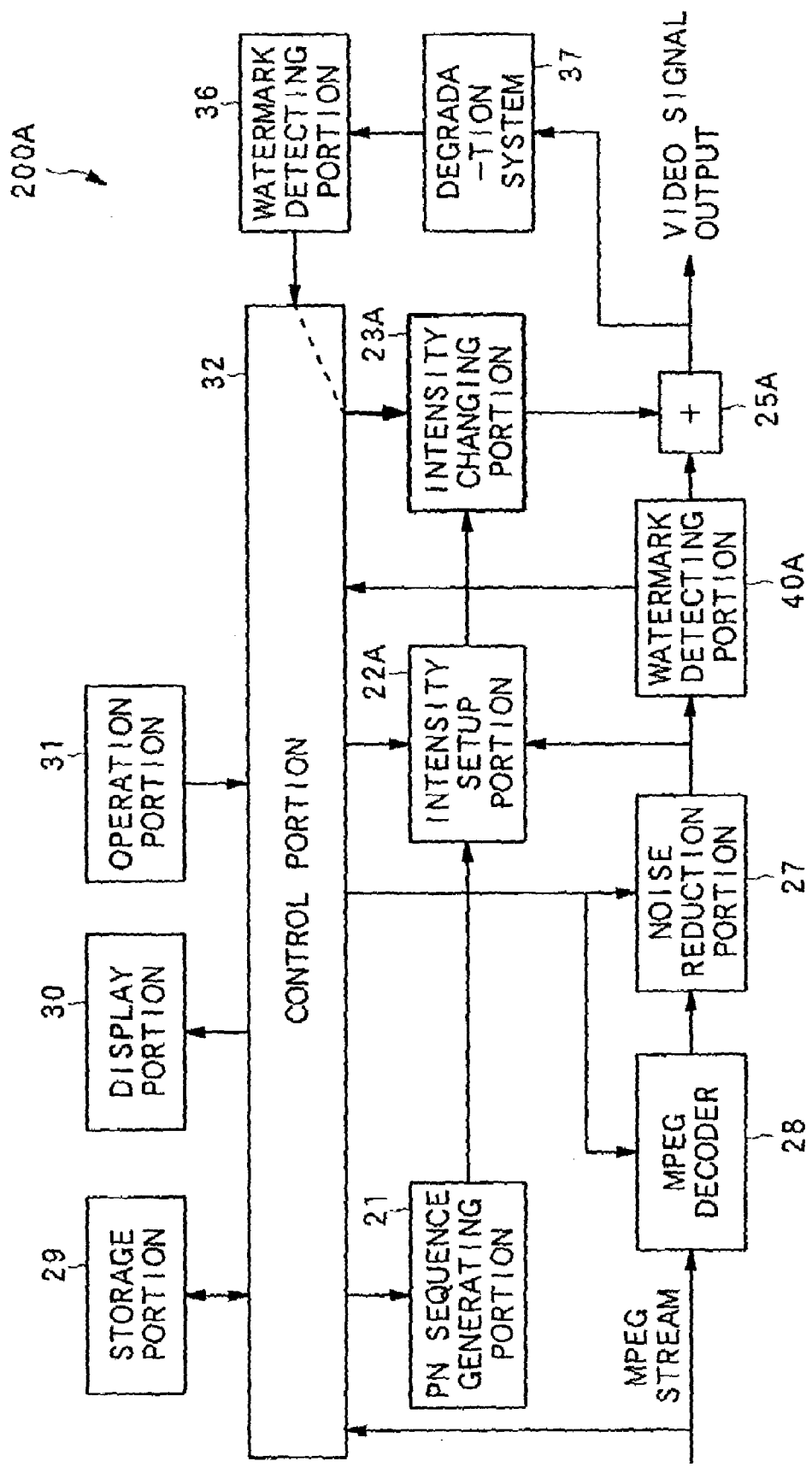

ELECTRONIC WATERMARK EMBEDDING APPARATUS, ELECTRONIC WATERMARK EMBEDDING METHOD, RECORD MEDIUM HAVING ELECTRONIC WATERMARK AND MANUFACTURING METHOD OF RECORD MEDIUM

BACKGROUND OF THE INVENTION

1. Field of the Invention

The present invention relates to an electronic watermark embedding apparatus, an electronic watermark embedding method and a record medium having an electronic watermark for embedding an electronic watermark for limiting duplication into contents comprised of digital information and a manufacturing method thereof.

2. Description of the Related Art

As digital TV broadcasting has been realized, distribution of images by digital signals is becoming popular. Also wide spread is a video recorder for recording the image as digital data on an optical disk, a magnetic tape and so on. Such a video recorder allows images recorded as digital data to be duplicated without deterioration. For this reason, it is necessary to limit the duplication of images from the viewpoint of copyright and so on.

For instance, the watermark (electronic watermark) technology disclosed in Japanese Patent Laid-Open No. 2000-173175 is one of the technologies for limiting the duplication of the image, and is the technology for embedding information on limitation of the duplication of a digital image. Hereafter, the information on the limitation of the duplication to be embedded into the digital image is called a "watermark." The watermark is embedded so as to be hidden in the image. For this reason, the embedding of the watermark hardly degrades the quality of the image. In addition, it is likely that a person having received the image having the watermark embedded therein cannot even recognize that the watermark exists in the image, and so it is extremely difficult to eliminate the watermark from the image.

The Japanese Patent Laid-Open No. 2000-173175 discloses a system using the watermark indicating prohibition of the duplication and the watermark indicating permission of one-generation duplication. As such a system can manage the number of times of the duplication, it will not cause a copyright problem and a viewer of a TV broadcast can see a distributed image without being bound by broadcasting time.

According to this system, when the digital image is inputted to the video recorder, the video recorder determines whether or not the watermark exists in the image. If the watermark exists therein and indicates the prohibition of the duplication, the video recorder does not record the image. If no watermark exists therein or the watermark exists therein and indicates the one-generation duplication permission, the video recorder determines that it is allowed to duplicate the image once, and records the image on the optical disk for instance. At this time, if the watermark indicates the one-generation duplication permission, the video recorder embeds the watermark indicating the prohibition of the duplication into the image and records it.

In the case of producing package media such as a video tape or a DVD or in the case of distributing the image from a broadcast station, a noise reduction process for reducing a noise component of the image may be performed. There are also the cases where a bit rate of compression in performing compression recording is changed according to a work or the bit rate of compression is switched within the work. In the case of embedding the watermark into the image contents, however, the watermark is influenced by intensity of the noise reduction process and the bit rate of compression in recording the image contents. Since a degree of degradation of the watermark changes in conjunction with the intensity of these processes, the degree of degradation increases when the intensity of the noise reduction process is increased or the bit rate of compression is decreased (compression ratio is increased) for instance, so that it may become difficult to read the watermark on reproduction.

In the case where the intensity of the noise reduction process is increased or the bit rate of compression is decreased, the image of that portion normally tends to become flat. However, the watermark is apt to be prominent in a flat image, and so it should be embedded with decreased intensity. For this reason, if there continues to be a state of high intensity of the noise reduction process or a state of low bit rate of compression, there also continues to be the state of low intensity of the watermark consequently, and thus it may become difficult to detect the watermark.

SUMMARY OF THE INVENTION

An object of the present invention is to provide an electronic watermark embedding apparatus, an electronic watermark embedding method, a record medium having an electronic watermark capable of securely detecting the watermark in the case of performing the noise reduction process or data compression process to the information on the contents and a manufacturing method of record medium.

The above object of the present invention can be achieved by the electronic watermark embedding apparatus of the present invention. The electronic watermark embedding apparatus is provided with an embedding device for embedding an electronic watermark comprised of a signal generated based on a predetermined rule into contents comprised of digital information; a variation device for varying intensity of the electronic watermark to be embedded into the contents; and a controlling device for controlling the variation device so as to change the intensity of the electronic watermark, and wherein the controlling device for controlling the variation device so as to increase the intensity of the electronic watermark at intervals is provided.

In one aspect of the present invention can be achieved by the electronic watermark embedding apparatus of the present invention. The electronic watermark embedding apparatus of the present invention is provided with an embedding device for embedding an electronic watermark comprised of a signal generated based on a predetermined rule into contents comprised of digital information; a variation device for varying intensity of the electronic watermark to be embedded into the contents; and a controlling device for controlling the variation device so as to change the intensity of the electronic watermark, wherein the controlling device for controlling the variation device so as to increase the intensity of the electronic watermark at intervals is provided, wherein the variation device is provided with a setup device for setting up the intensity of the electronic watermark based on an information signal of the contents; and a changing device for changing the intensity of the electronic watermark set up by the setup device so as to increase it at intervals.

In another aspect of the present invention can be achieved by the record medium of the present invention. The record medium is provided with, an image having an electronic watermark comprised of a signal generated based on a predetermined rule embedded into contents comprised of digital information, wherein: an intensity of the electronic watermark embedded in the contents is increased at intervals.

According to the present invention, the electronic watermark embedding apparatus increases the intensity of a watermark embedded in the contents by keeping intervals, and so it can securely detect the watermark in a portion of high intensity. In addition, as the portions of high intensity are placed by keeping the intervals, it is possible, by taking longer intervals for these portions, to curb the influence of the watermark on image quality.

The above object of the present invention can be achieved by the electronic watermark embedding apparatus of the present invention. The electronic watermark embedding apparatus is provided with: an embedding device for embedding an electronic watermark comprised of a signal generated based on a predetermined rule into contents comprised of digital information; a variation device for varying intensity of the electronic watermark to be embedded into the contents; and a controlling device for controlling the variation device so as to change the intensity of the electronic watermark a detection device for detecting whether or not a first electronic watermark is embedded in the contents, and if it is embedded, detecting a type thereof, wherein the controlling device for controlling the variation device so as to increase the intensity of the electronic watermark at intervals is provided and the controlling device exerts control so as to embed a new second electronic watermark based on detection results from the detection device.

In one aspect of the present invention can be achieved by the electronic watermark embedding apparatus of the present invention. The electronic watermark embedding apparatus of the present invention is provided with a detection device for detecting a first electronic watermark embedded in the contents, and an embedding device for embedding a second electronic watermark into the contents according to detection results of the detection device, and wherein: the detection device is placed more frontward than the embedding device.

According to the present invention, the electronic watermark embedding apparatus can have the first electronic watermark detected by the detection means without being influenced by signal processing between the detection means and embedding means, the first electronic watermark can be securely detected. In addition, as the second electronic watermark embedded by the embedding means is not influenced by the signal processing between the detection means and embedding means, degradation of the second electronic watermark can be curbed.

The above object of the present invention can be achieved by the electronic watermark embedding apparatus of the present invention. The electronic watermark embedding apparatus of the present invention is provided with a noise reduction device for performing a noise reduction process to the information of the contents, wherein the controlling device Controls the variation device so as to change the intensity of the electronic watermark in conjunction with the intensity of the noise reduction process by the noise reduction device.

In one aspect of the present invention can be achieved by the electronic watermark embedding apparatus of the present invention. The electronic watermark embedding apparatus of the present invention, wherein the controlling device controls the variation device so as to increase the intensity of the electronic watermark when the intensity of the noise reduction process by the noise reduction device is high.

According to the present invention, the electronic watermark embedding apparatus changes the intensity of the electronic watermark to be embedded into the contents in conjunction with the intensity of the noise reduction process by the noise reduction means. Therefore, it is possible to embed a watermark in a state capable of securely detecting it even in the case of performing the noise reduction process.

The above object of the present invention can be achieved by the electronic watermark embedding apparatus of the present invention. The electronic watermark embedding apparatus is provided with an embedding device for embedding an electronic watermark comprised of a signal generated based on a predetermined rule into contents comprised of digital information; a variation device for varying intensity of the electronic watermark to be embedded into the contents; a controlling device for controlling the variation device so as to change the intensity of the electronic watermark; and a compression device for compression-encoding the information of the contents; and wherein the controlling device for controlling the variation device so as to change the intensity of the electronic watermark in conjunction with compression ratio of the compression process by the compression device.

In one aspect of the present invention can be achieved by the electronic watermark embedding apparatus of the present invention. The electronic watermark embedding apparatus of the present invention is, wherein the controlling device controls the variation device so as to increase the intensity of the electronic watermark when the compression ratio of the compression process by the compression device is high.

According to the present invention, the electronic watermark embedding apparatus changes the intensity of the electronic watermark to be embedded into the contents in conjunction with the compression intensity of the compression encoding process by the compression encoding means. Therefore, it is possible to embed the watermark in the state capable of securely detecting it even in the case of performing the compression encoding process.

The above object of the present invention can be achieved by the record medium of the present invention. The record is provided with an image having an electronic watermark comprised of a signal generated based on a predetermined rule embedded into contents comprised of digital information, wherein: the intensity of the electronic watermark changes in conjunction with the intensity of the noise reduction process and the information on the contents undergoes a noise reduction step.

According to the present invention, the record medium having the electronic watermark changes the intensity of the electronic watermark to be embedded into the contents in conjunction with the intensity of the noise reduction process. Therefore, it is possible to securely detect the embedded watermark even in the case of performing the noise reduction process.

The above object of the present invention can be achieved by the record medium of the present invention. The record is provided with an image having an electronic watermark comprised of a signal generated based on a predetermined rule embedded into contents comprised of digital information, wherein: the information on the contents undergoes a data compression step by compression encoding; and the intensity of the electronic watermark changes in conjunction with compression intensity of the data compression step.

According to the present invention, the record medium having the electronic watermark changes the intensity of the electronic watermark to be embedded into the contents in conjunction with the intensity of the compression encoding process. Therefore, it is possible to securely detect the embedded watermark even in the case of performing the compression encoding process.

The above object of the present invention can be achieved by the electronic watermark embedding apparatus of the present invention. The electronic watermark embedding apparatus is provided with: an embedding device for embedding an electronic watermark comprised of a signal generated based on a predetermined rule into contents comprised of digital information; a variation device for varying intensity of the electronic watermark to be embedded into the contents; and a controlling device for controlling the variation device so as to change the intensity of the electronic watermark; and a detection device for detecting the electronic watermark embedded in the first signal by the embedding device, wherein the embedding device further for adding to the signal of the contents the electronic watermark having its intensity varied by the variation device and thereby generating a first signal; and the controlling device for controlling the variation device so as to vary the intensity of the electronic watermark according to detection results of the detection device.

In one aspect of the present invention can be achieved by the electronic watermark embedding apparatus of the present invention. The electronic watermark embedding apparatus of the present invention, is wherein, in the case where the intensity of the electronic watermark detected by the detection device is low, the controlling device controls the variation device to have the intensity increased thereby.

According to the present invention, the electronic watermark embedding apparatus varies the intensity of the electronic watermark according to the detection results of the detection procedure, and so the detection results of the detection means can be reflected on the intensity of the electronic watermark embedded by the embedding means. Therefore, it is possible to adequately control the intensity of the electronic watermark in order to securely detect the watermark while curbing deterioration of the image and so on.

To render the present invention easier to understand, reference symbols of the attached drawings are added in parentheses. However, the present invention is not thereby limited to the forms in the drawings.

BRIEF DESCRIPTION OF THE DRAWINGS

FIG. 25 is a block diagram showing the electronic watermark embedding apparatus according to an eighteenth embodiment.

DESCRIPTION OF THE PREFERRED EMBODIMENTS

Figure 1:
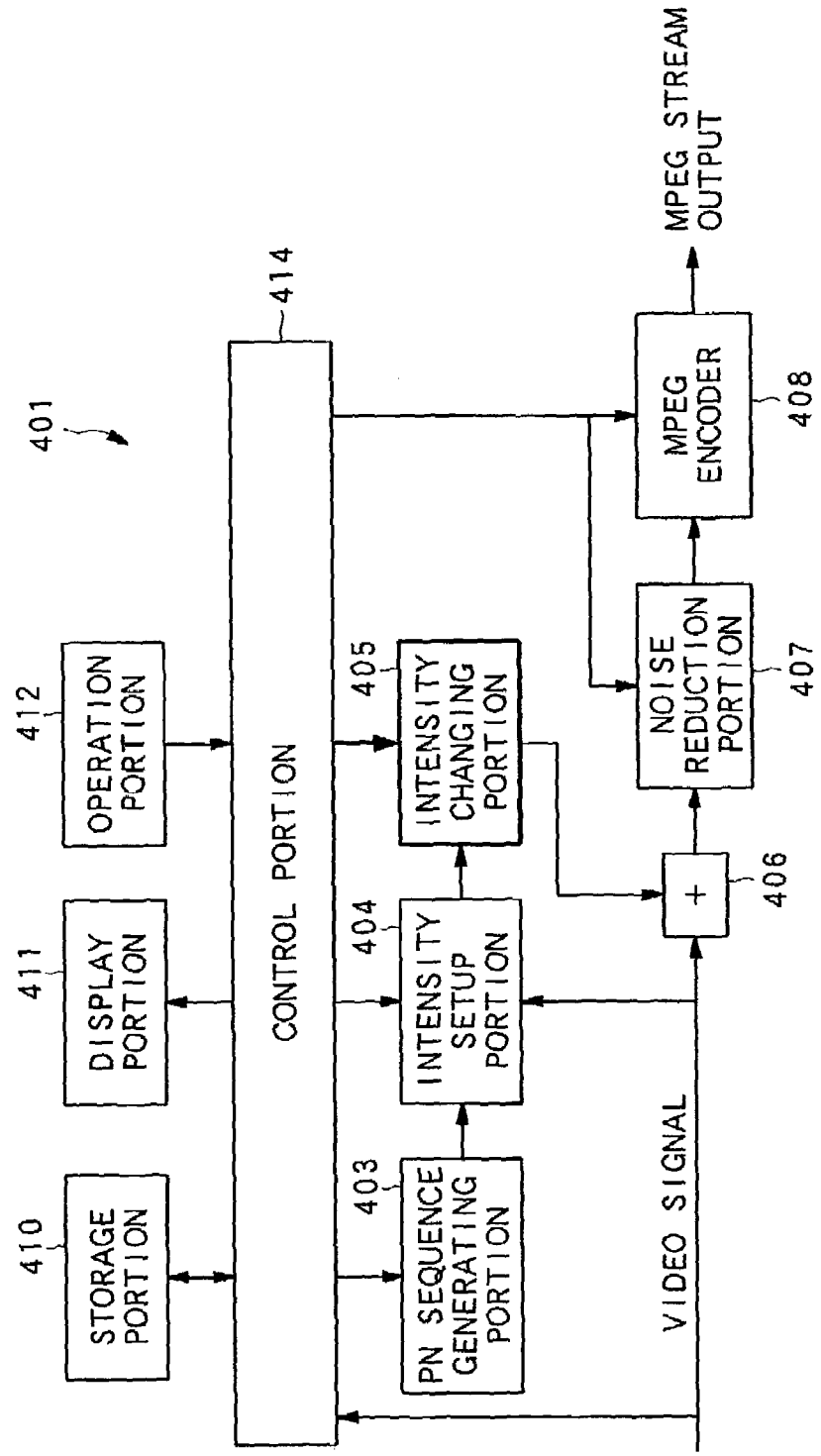
FIG. 1 is a block diagram showing an electronic watermark embedding apparatus according to a first embodiment.

Hereafter, embodiments of an electronic watermark embedding apparatus according to the present invention will be described in detail by referring to the drawings. While these embodiments illustrate image contents as the contents comprised of digital information, they are applicable to the contents comprised of any digital information such as music information.

First Embodiment

Hereafter, a first embodiment of the electronic watermark embedding apparatus according to the present invention will be described by referring to FIGS. 1 to 6.

FIG. 1 is a block diagram showing an electronic watermark embedding apparatus 401 according to the first embodiment. The electronic watermark embedding apparatus 401 embeds a watermark (electronic watermark) in a video signal which is a base band.

As shown in FIG. 1, the electronic watermark embedding apparatus 401 has a PN sequence generating portion 403 for generating a PN (Pseudorandom Noise) sequence constituting the watermark (electronic watermark) used as information on limitation of duplication of the image contents, an intensity setup portion 404 for amplifying the PN sequence outputted from the PN sequence generating portion 403 and setting up the intensity thereof, an intensity changing portion 405 for changing the intensity of the PN sequence, an addition portion 406 for adding the video signal to the PN sequence, a noise reduction portion 407 for reducing the noise of the video signal, an MPEG encoder 408 for compression-encoding the data of the image contents, a storage portion 410 having an RAM and an ROM, a display portion 411 for presenting predetermined information to an operator, an operation portion 412 for receiving an operation of the operator, and a control portion 414 for controlling the above portions.

The electronic watermark embedding apparatus 401 can be used as a part of broadcasting equipment of a broadcast station for instance. In this case, it is possible to distribute the image by amplifying an MPEG stream outputted from the MPEG encoder 408 with a video signal outputting apparatus and sending it via an antenna.

The electronic watermark embedding apparatus 401 can be used as a part of a recording apparatus used by a motion picture company for instance. In this case, it is possible to embed the watermark into the contents having no watermark so as to record the contents on a record medium such as an optical disk or a video tape.

Next, a description will be given by referring to FIGS. 2 to 5 as to the watermark comprised of the PN sequence generated by the PN sequence generating portion 403.

Figure 2:
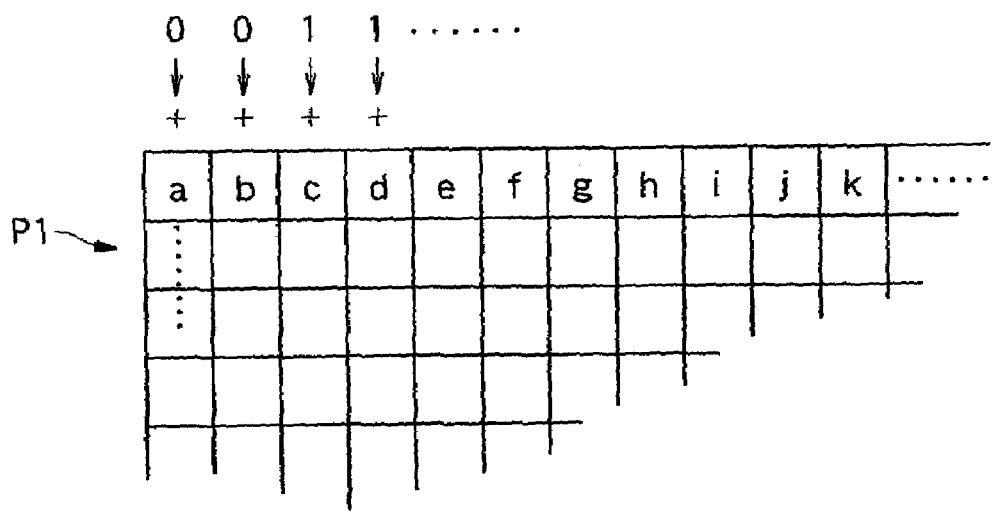
FIG. 2 is a diagram explaining a watermark.

A digital image includes the information representing luminance of each image constituting the digital image. The information representing the luminance is a numerical value of 4 to 8 bits or so for instance, and is corresponding to a pixel constituting the image respectively. To be more specific, the numerical value representing the luminance is individually set up for each pixel (hereafter, the numerical value representing the luminance of the pixel is referred to as a "luminance value"). To describe it concretely by using FIG. 2, an image P1 in FIG. 2 is one of the images constituting the digital image, and a, b, c, d . . . in the image P1 indicate the luminance values set up for the respective pixels.

Figure 3:
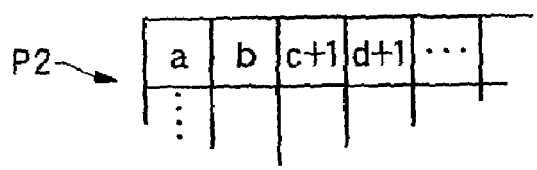
FIG. 3 is a diagram explaining the watermark.

The watermark is comprised of a signal generated based on a predetermined rule, that is, the PN sequence in this embodiment for instance, and is embedded into the image by adding the symbols of the PN sequence to the luminance values of the pixels respectively. For instance, "0011 . . . " in FIG. 2 is the PN sequence constituting the watermark. If this PN sequence is added to the luminance values a, b, c, d . . . in the image P1, the luminance values become a, b, c+1, d+1 . . . as shown in FIG. 3. Thus, the watermark is embedded in each image constituting the digital image.

The PN sequence constituting the watermark is a sequence of pseudorandom signals such as an M sequence for instance, and is generated by giving an initial value to a polynomial (generating equation) for generating the PN sequence. In this embodiment, the polynomial (generating equation) for generating the PN sequence is embodied as a PN sequence generating circuit 101 shown in FIG. 4 for instance. The PN sequence generating circuit 101 is comprised of shift registers 1A to 1D and an adder 1E, and is provided to the PN sequence generating portion 403. As for the PN sequence which are actually used, those having a larger number of the shift registers are used so that a sequence period will be longer.

According to this embodiment, two types of mutually different PN sequences are generated, where one of them is used as the watermark for indicating the permission of one-generation duplication and the other is used as the watermark for indicating the prohibition of the duplication. The PN sequence has an arrangement of random symbols changed by changing one or both of the polynomial and initial value. Therefore, it is possible to generate a different PN sequence by changing one or both of the polynomial and initial value.

Figure 4:
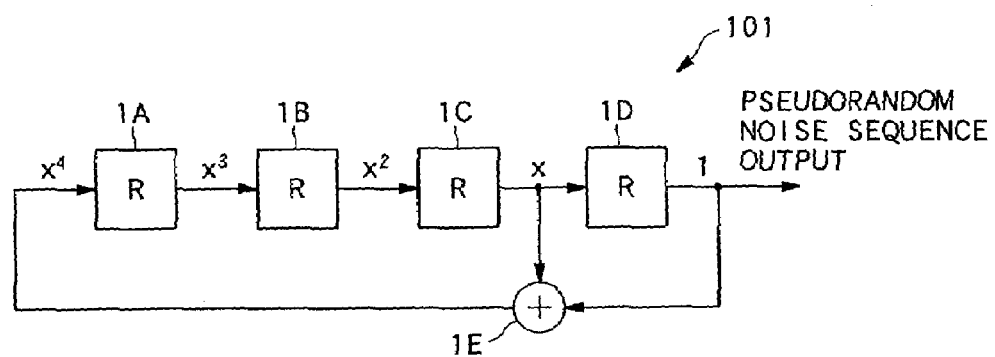
FIG. 4 is a diagram showing configuration of a PN sequence generating circuit.
Figure 5:
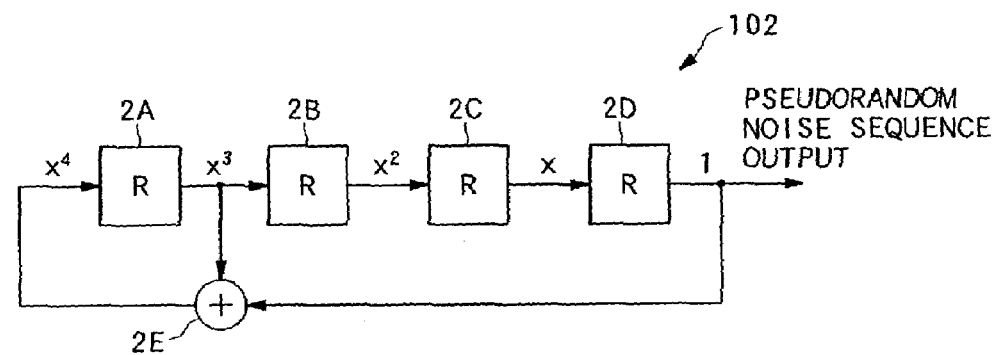
FIG. 5 is a diagram showing the configuration of the PN sequence generating circuit.

For instance, the PN sequence to be used as the watermark for indicating the permission of the one-generation duplication is generated by the PN sequence generating circuit 101 shown in FIG. 4. On the other hand, the PN sequence to be used as the watermark for indicating the prohibition of the duplication is generated by a PN sequence generating circuit 102 shown in FIG. 5. The PN sequence generating circuit 102 shown in FIG. 5 embodies the polynomial (generating equation) different from the polynomial (generating equation) corresponding to the PN sequence generating circuit 101, and is comprised of shift registers 2A to 2D and an adder 2E. The PN sequence generating circuit 102 is also provided to the PN sequence generating portion 403.

It is apparent that the polynomial corresponding to the PN sequence generating circuit 101 is different from the polynomial corresponding to the PN sequence generating circuit 102 because the connections of the shift registers and the adder are different between the PN sequence generating circuit 101 and the PN sequence generating circuit 102. Thus, it is possible to generate the watermark for indicating the permission of the one-generation duplication and the watermark for indicating the prohibition of the duplication by using the two PN sequence generating circuits different in the connection or constitution (that is, two polynomials of different structures) respectively.

It is also possible, by using only the PN sequence generating circuit 101 shown in FIG. 4, to generate the watermark for indicating the permission of the one-generation duplication and the watermark for indicating the prohibition of the duplication respectively. In this case, two kinds of the initial values to be given to the PN sequence generating circuit 101 are prepared. One of the two kinds of the initial values is given to the PN sequence generating circuit 101 so as to generate the PN sequence constituting the watermark for indicating the permission of the one-generation duplication, and the other initial value is given to the same PN sequence generating circuit 101 so as to generate the PN sequence constituting the watermark for indicating the prohibition of the duplication. For instance, when generating the PN sequence constituting the watermark for indicating the permission of the one-generation duplication, an initial value "0011" is inputted to the shift registers 1A to 1D. On the other hand, when generating the PN sequence constituting the watermark for indicating the prohibition of the duplication, an initial value "0101" is inputted to the shift registers 1A to 1D.

Next, the operation of the intensity setup portion 404 will be described.

As shown in FIG. 1, the intensity setup portion 404 has the video signal and the PN sequence outputted from the PN sequence generating portion 403 inputted thereto. And the intensity setup portion 404 sets the PN sequence from the PN sequence generating portion 403 at appropriate intensity based on the inputted video signal. To be more specific, the intensity setup portion 404 detects whether the luminance values set respectively to the pixels constituting one image have changed greatly or slightly. If the luminance values have changed greatly, the image has a complicated pattern for instance, so that the watermark does not become prominent even if embedded therein. Thus, if the luminance values have changed greatly, the intensity setup portion 404 sets the PN sequence, that is, the watermark outputted from the PN sequence generating portion 403 at a rather high intensity. For instance, in the case where the PN sequence is "0101 . . . ," the intensity setup portion 404 sets it at "0202" or "0303." And the intensity setup portion 404 outputs the PN sequence which is set to the intensity changing portion 405.

If the luminance values set to the pixels constituting one image respectively have changed slightly, the image is a flat image for instance, so that the watermark is apt to be prominent. Thus, if the luminance values have changed slightly, the intensity setup portion 404 outputs the PN sequence outputted from the PN sequence generating portion 403 as-is to the intensity changing portion 405.

Next, the operation of the intensity changing portion 405 will be described.

The intensity changing portion 405 is controlled by the control portion 414 to increase the intensity of the PN sequence outputted from the intensity setup portion 404 at certain intervals for a short period of time by an equivalent of only a few frames (1 to 3 frames) for instance so as to output it to the addition portion 406.

To be more specific, the control portion 414 exerts control so that the intensity changing portion 405 increases the intensity of the PN sequence at random intervals or unfixed intervals according to some rule, for each change of scenes, each image having many edges (complicated image, active image) and each image of fierce move (image of large motion vector).

And the addition portion 406 adds the video signal to the PN sequence outputted from the intensity changing portion 405, and outputs it to the noise reduction portion 407. The noise reduction portion 407 performs a noise reduction process to the video signal having the PN sequence added thereto, and outputs it to the MPEG encoder 408. The MPEG encoder 408 compression-encodes the video signal having undergone the noise reduction process, and outputs it as an MPEG stream.

Here, the reason why the intensity changing portion 405 increases the intensity of the PN sequence, that is, the watermark at random intervals or unfixed intervals is that existence of the watermark is less recognizable for a viewer on the image in which its intensity is increased at the random or unfixed intervals (random or unfixed time intervals) than on the image in which it is increased at the fixed intervals (fixed time intervals).

Also, the reason why the intensity changing portion 405 increases the intensity of the watermark for each change of scenes, each image having many edges and each image of fierce move is that the watermark becomes less recognizable for the viewer by means of the image often changing timewise due to switching of the scenes, the image having many edges and the image of fierce move even if the intensity of the watermark is high.

Thus, the electronic watermark embedding apparatus 401 can embed into the image contents the watermark of such high intensity as to be securely detected. In this case, the watermark to be embedded by the electronic watermark embedding apparatus 401 is the equivalent of only a few frames, and so the influence on the image contents is so slight that it does not substantially degrade the image.

It is also possible for the control portion 414 to control the intensity changing portion 405 at the above-mentioned random or unfixed intervals, for each change of scenes, for each image having many edges, for each image of fierce move, and in addition, by combining these. For instance, the control portion 414 controls the intensity changing portion 405 on the change of scenes after the random or unfixed time has elapsed. In this case, it is sufficient if the cycle for increasing the intensity of the PN sequence is consequently random or unfixed, and so it is also feasible for the control portion 414 to control the intensity changing portion 405 on the change of the scenes after the fixed time has elapsed.

Figure 6:
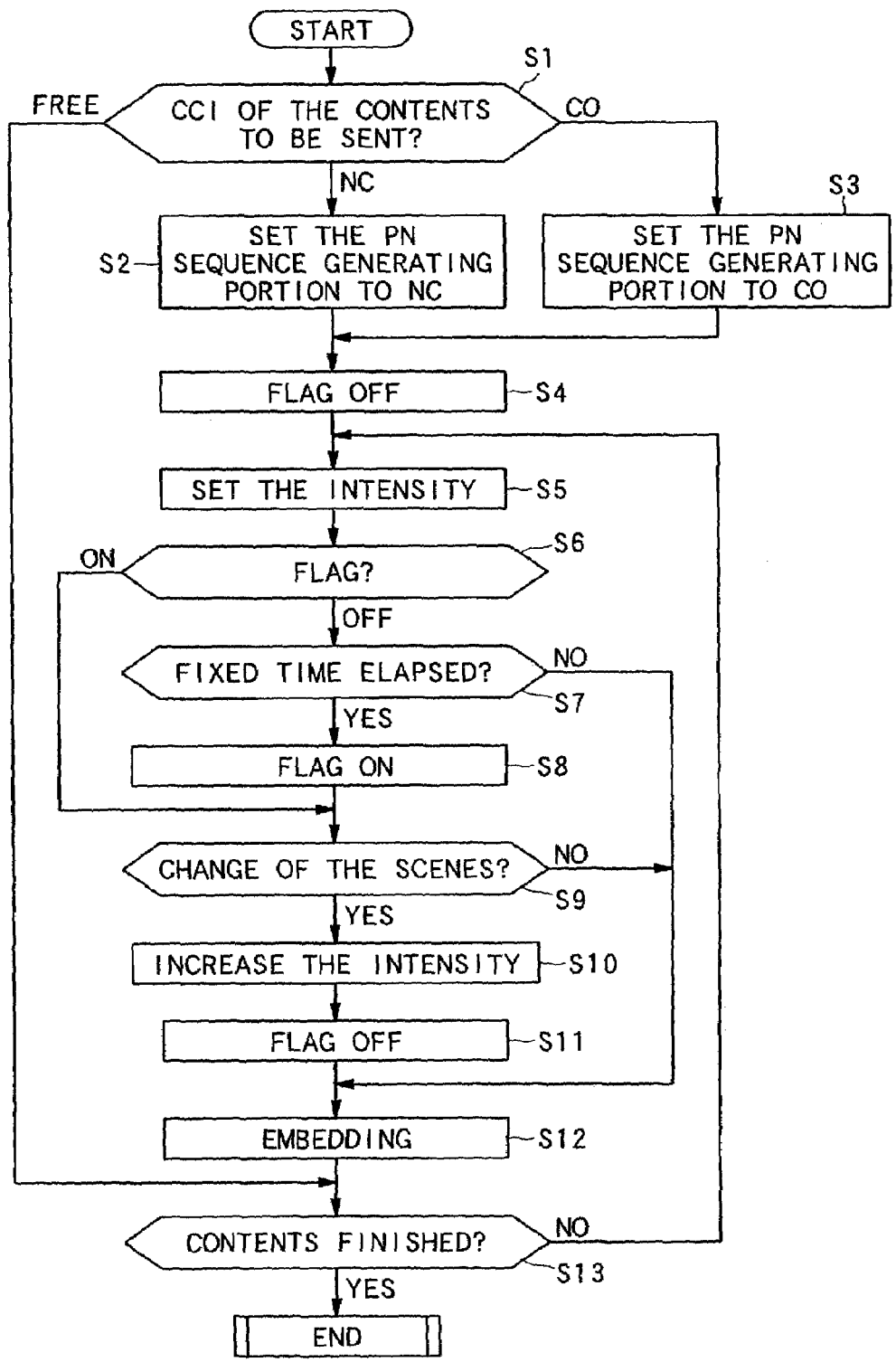
FIG. 6 is a flowchart showing operation of the electronic watermark embedding apparatus according to the first embodiment.

Next, the operation of the electronic watermark embedding apparatus 401 will be described by referring to FIG. 6. FIG. 6 is a flowchart showing the process for increasing the intensity of the watermark on the change of the scenes after the fixed time has elapsed. This process is performed based on the control of the control portion 414.

In a step S1, the control portion 414 determines if it is prohibition of duplication (NC: Never Copy), one-generation duplication permission (CO: Copy Once) or duplication permission (Free) based on CCI (Copy Control Information) added to the inputted video signal. It moves on to a step S2 in the case of the prohibition of duplication, moves on to a step S3 in the case of the one-generation duplication permission, and skips to a step S13 in the case of the duplication permission.

In the step S2, it sets a PN sequence generating portion 403 to generate the PN sequence, that is, the watermark corresponding to the prohibition of the duplication, and moves on to a step S4. In the step S3, the control portion 414 sets the PN sequence generating portion 403 to generate the PN sequence, that is, the watermark corresponding to the one-generation duplication permission and moves on to a step S4.

Next, the control portion 414 performs initialization for turning off a flag and sets a timer not shown (step S4), and controls the intensity setup portion 404 to set the intensity of the PN sequence (step S5). Next, the control portion 414 determines whether the flag is on or off (step S6), skips to a step S9 if it is on, and moves on to a step S7 if it is off.

In the step S7, the control portion 414 determines whether or not the fixed time has elapsed as to clocking of the timer. It turns on the flag (step S8) and moves on to a step S9 if the fixed time has elapsed, and skips to a step S12 if not.

In the step S9, the control portion 414 determines whether or not there was the change of the scenes based on the inputted video signal. It moves on to a step S11 in the case where there was the change of the scenes, and skips to a step S12 in the case where there was none.

Next, the control portion 414 controls the intensity changing portion 405 to increase the intensity of the PN sequence by a few frames (step S10), and turns off the flag (step S11).

In the step S12, the addition portion 406 adds the inputted video signal to the PN sequence, that is, the watermark of increased intensity from the intensity changing portion 405. The video signal having the watermark embedded therein is outputted as the MPEG stream by way of the noise reduction portion 407 and the MPEG encoder 408.

In a step S13, the control portion 414 determines whether or not input of the video signal of the image contents is finished. It finishes the processing if the input is finished, and returns to the step S5 to perform the processing if not finished.

As described above, as for the processing in FIG. 6, the electronic watermark embedding apparatus 401 repeats the processing wherein it first sets the intensity of the PN sequence in the intensity setup portion 404, and on the change of the scenes after the fixed time has elapsed, it increases the intensity of the PN sequence in the intensity changing portion 405. Therefore, the electronic watermark embedding apparatus 401 can embed the watermark of the increased intensity into the image contents on the change of the scenes after the fixed time has elapsed. Thus, the watermark can be securely detected, and is not prominent in the image.

Second Embodiment

Figure 7:
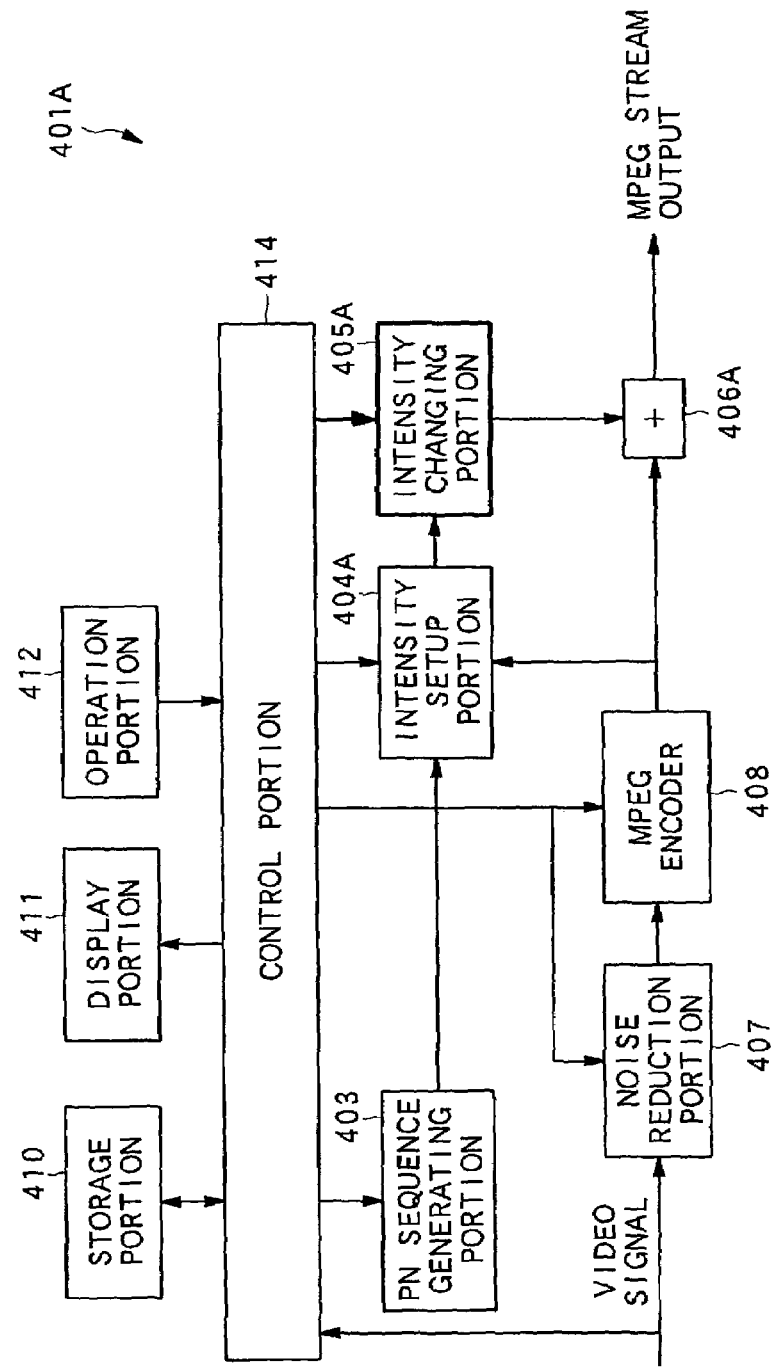
FIG. 7 is a block diagram showing the electronic watermark embedding apparatus according to a second embodiment.

Hereafter, a second embodiment of the electronic watermark embedding apparatus according to the present invention will be described by referring to FIG. 7. In FIG. 7, the elements corresponding to the configuration of the first embodiment are given the same symbols and a description thereof will be omitted.

FIG. 7 is a block diagram showing an electronic watermark embedding apparatus 401A according to the second embodiment. The electronic watermark embedding apparatus 401A embeds the watermark in the MPEG stream having MPEG-encoded the image contents, and can be used, for instance, as a part of a recorder for recording the video signal sent from a broadcast station on the record medium.

As shown in FIG. 7, the electronic watermark embedding apparatus 401A according to the second embodiment has the noise reduction process performed to the video signal by the noise reduction portion 407, and further has the compression encoding process performed by the MPEG encoder 408 so as to input the MPEG stream obtained by the compression encoding to an intensity setup portion 404A and an addition portion 406A. Therefore, the intensity setup portion 404A sets up the intensity of the PN sequence based on this MPEG stream. The addition portion 406A adds the PN sequence to this MPEG stream.

An intensity changing portion 405A increases the intensity of the PN sequence outputted from an intensity setup portion 404A in predetermined timing, and outputs it to an addition portion 406A. As for the operation of the intensity changing portion 405A, the same operation as that of the intensity changing portion 405 according to the first embodiment may be adopted.

As described above, the electronic watermark embedding apparatus 401A has the noise reduction by the noise reduction portion 407 and the compression encoding process by the MPEG encoder 408 performed to the video signal so as to superimpose the PN sequence, that is, the watermark of the increased intensity on a generated MPEG stream.

The electronic watermark embedding apparatus 401A thereby embeds the watermark after the noise reduction process and the compression encoding process which consequently degrade the watermark, so that there is no possibility of degrading the watermark. Therefore, the electronic watermark embedding apparatus 401A has an advantage that it can more appropriately manage the intensity and state of the watermark of the video signal outputted as the MPEG stream.

Third Embodiment

Figure 8:
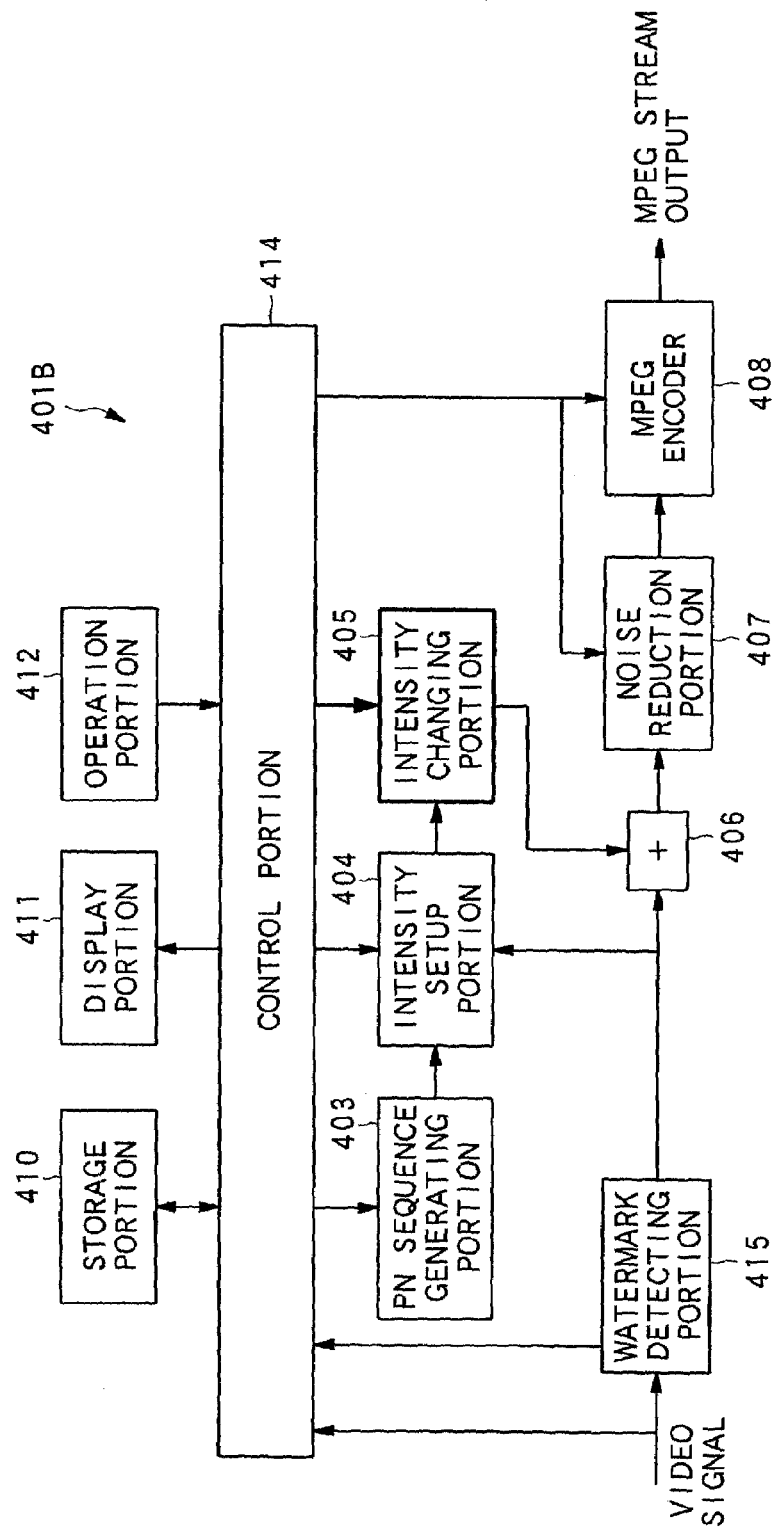
FIG. 8 is a block diagram showing the electronic watermark embedding apparatus according to a third embodiment.

Hereafter, a third embodiment of the electronic watermark embedding apparatus according to the present invention will be described by referring to FIG. 8. In FIG. 8, the elements corresponding to the configuration of the first embodiment are given the same symbols and a description thereof will be omitted.

FIG. 8 is a block diagram showing an electronic watermark embedding apparatus 401B according to the third embodiment. The electronic watermark embedding apparatus 401B re-embeds (re-marks) the watermark in the video signal referred to as the base band in which the watermark has already been embedded, and can be used as a part of the broadcasting equipment of the broadcast station or as a part of the recording equipment of the motion picture company as with the electronic watermark embedding apparatus 401.

As shown in FIG. 8, the electronic watermark embedding apparatus 401B has a watermark detecting portion 415 for detecting the watermark from an inputted video signal.

Before recording a received video signal on the record medium such as the optical disk, the watermark detecting portion 415 detects whether or not the watermark is embedded in the video signal and whether the watermark embedded in the video signal indicates the one-generation duplication permission or the prohibition of the duplication so as to output the detection results to the control portion 414.

In the case where the watermark indicating the one-generation duplication permission is detected by the watermark detecting portion 415, the PN sequence generating portion 403 generates the PN sequence corresponding to the prohibition of the duplication. The intensity of the PN sequence is set up by the intensity setup portion 404 as with the first embodiment, and the intensity is further changed by the intensity changing portion 405. The PN sequence outputted from the intensity changing portion 405 is added to the video signal by the addition portion 406.

The intensity changing portion 405 increases the intensity of the PN sequence, that is, the watermark outputted from the intensity setup portion 404 by an equivalent of a few frames, and outputs it to an addition portion 406. As for the operation of the intensity changing portion 405, the same operation as that of the intensity changing portion 405 according to the first embodiment may be adopted. The video signal in which the watermark is embedded has the noise reduction process by the noise reduction portion 407 and the MPEG encoding by the MPEG encoder 408 performed thereto so as to be outputted as the MPEG stream.

Thus, in the case where embedding of the watermark indicating the one-generation duplication permission is detected, the electronic watermark embedding apparatus 401B can re-mark in the image contents the watermark indicating the prohibition of the duplication having such high intensity as to be securely detected. In this case, the watermark to be re-marked by the electronic watermark embedding apparatus 401B is the equivalent of only a few frames, and so the influence on the image contents is so slight that it does not substantially degrade the image.

In the case where the watermark indicating the one-generation duplication permission and the watermark indicating the prohibition of the duplication are not detected by the watermark detecting portion 415, the contents are duplicable and so they are outputted as the MPEG stream without having the watermark re-marked by the addition portion 406.

In the case where the watermark indicating the prohibition of the duplication is detected by the watermark detecting portion 415, the control portion 414 exerts control to prohibit the recording.

Fourth Embodiment

Figure 9:
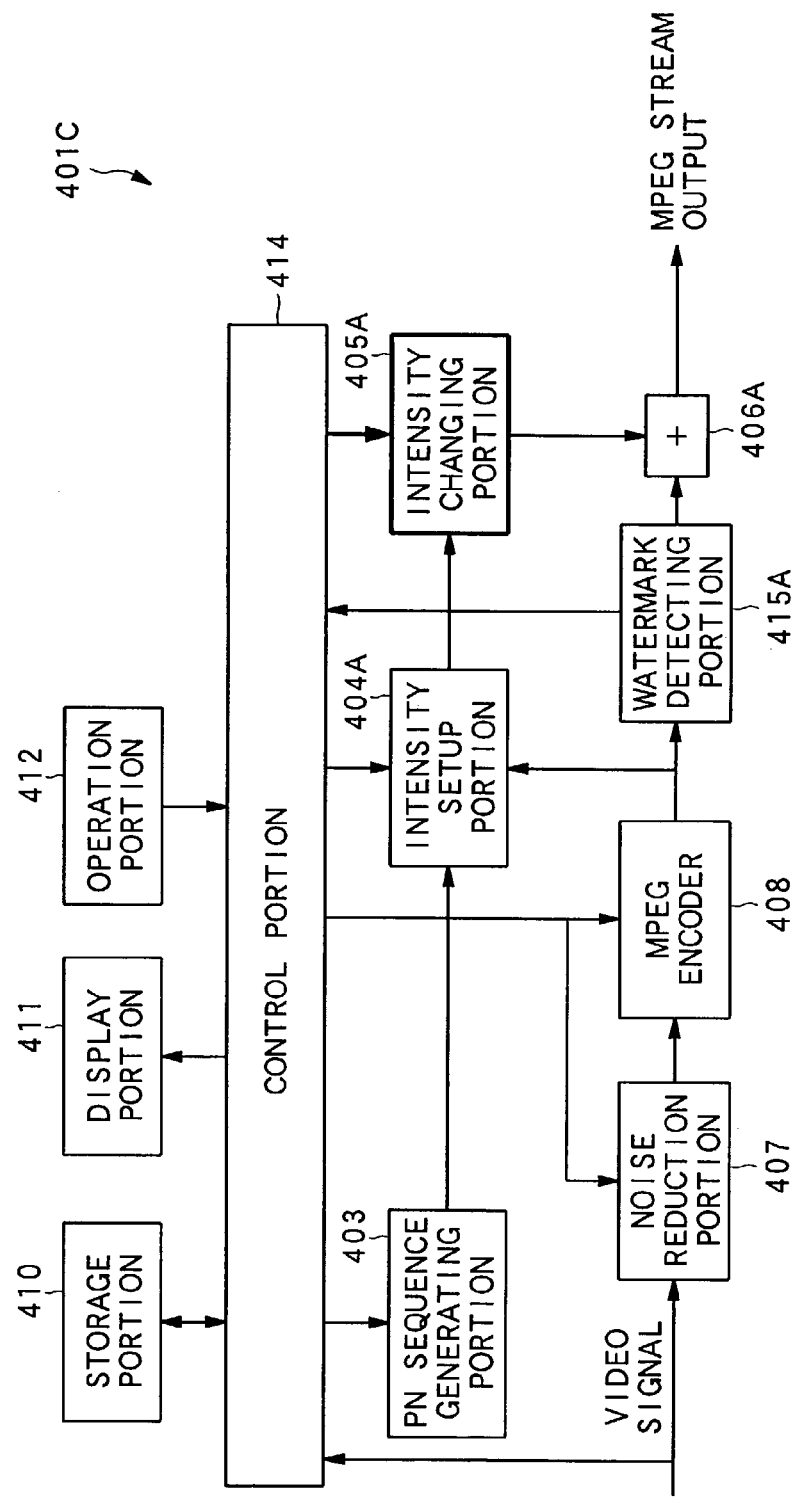
FIG. 9 is a block diagram showing the electronic watermark embedding apparatus according to a fourth embodiment.

Hereafter, a fourth embodiment of the electronic watermark embedding apparatus according to the present invention will be described by referring to FIG. 9. In FIG. 9, the elements corresponding to the configuration of the first embodiment are given the same symbols and a description thereof will be omitted.

FIG. 9 is a block diagram showing an electronic watermark embedding apparatus 401C according to the fourth embodiment. The electronic watermark embedding apparatus 401C re-embeds (re-marks) the watermark in the MPEG stream in which the watermark has already been embedded, and can be used as a part of the recording equipment for recording the video signal sent from the broadcast station on the record medium as with the electronic watermark embedding apparatus 401A.

As shown in FIG. 9, the electronic watermark embedding apparatus 401C has a watermark detecting portion 415A for detecting the watermark from the MPEG stream generated by performing the noise reduction process by the noise reduction portion 407 and the compression encoding process by the MPEG encoder 408 to the inputted video signal.

Before recording the received MPEG stream on the record medium such as the optical disk, the watermark detecting portion 415A detects whether or not the watermark is embedded in the MPEG stream and whether the watermark embedded in the MPEG stream indicates the one-generation duplication permission or the prohibition of the duplication so as to output the detection results to the control portion 414.

In the case where the watermark indicating the one-generation duplication permission is detected by the watermark detecting portion 415A, the PN sequence generating portion 403 generates the PN sequence corresponding to the prohibition of the duplication. The intensity of the PN sequence is set up by the intensity setup portion 404A as with the intensity setup portion 404 of the first embodiment, and the intensity is further changed by the intensity changing portion 405A. The PN sequence outputted from the intensity changing portion 405A is added to the MPEG stream by the addition portion 406A.

The intensity changing portion 405A increases the intensity of the PN sequence, that is, the watermark outputted from the intensity setup portion 404 by an equivalent of only a few frames, and outputs it to the addition portion 406. As for the operation of the intensity changing portion 405A, the same operation as that of the intensity changing portion 405 according to the first embodiment may be adopted.

As described above, the electronic watermark embedding apparatus 401C has the compression encoding process by the MPEG encoder 408 and the noise reduction by the noise reduction portion 407 performed to the video signal so that, in the case where embedding of the watermark indicating the one-generation duplication permission in the generated MPEG stream is detected, it superimposes the PN sequence, that is, the watermark of the increased intensity thereon.

The electronic watermark embedding apparatus 401C thereby re-marks the watermark after the compression encoding process and the noise reduction process which consequently degrade the watermark, so that it does not degrade the watermark. Therefore, the electronic watermark embedding apparatus 401C has an advantage that it can more appropriately manage the intensity and state of the watermark of the video signal outputted as the MPEG stream.

In the case where the watermark indicating the one-generation duplication permission and the watermark indicating the prohibition of the duplication are not detected by the watermark detecting portion 415A, the contents are duplicable and so they are outputted as the MPEG stream without having the watermark re-marked by the addition portion 406A.

In the case where the watermark indicating the prohibition of the duplication is detected by the watermark detecting portion 415A, the control portion 414 exerts control to prohibit the recording.

Here, in the electronic watermark embedding apparatus 401B shown in FIG. 8, the watermark detecting portion 415 and the addition portion 406 are positioned more upstream than the noise reduction portion 407. To be more specific, the electronic watermark embedding apparatus 401B detects and re-marks the watermark of the video signal before the noise reduction. In addition, in the electronic watermark embedding apparatus 401C shown in FIG. 9, the watermark detecting portion 415A and the addition portion 406A are positioned more downstream than the MPEG encoder 408. To be more specific, the electronic watermark embedding apparatus 401C detects and re-marks the watermark of the MPEG stream generated by performing the noise reduction and MPEG encoding to the video signal.

Thus, the electronic watermark embedding apparatuses 401B and 401C shown in FIGS. 8 and 9 detect and re-mark the watermark at the same position in reference to the positions of the noise reduction portion 407 and the MPEG encoder 408.

Figure 10:
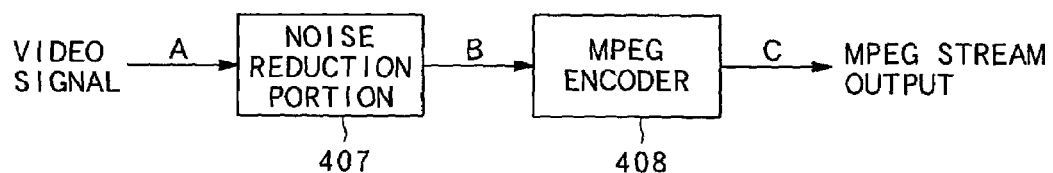
FIG. 10 is a diagram showing positions of a watermark detecting portion and an addition portion.

However, the electronic watermark embedding apparatus according to the present invention is not limited to such configuration. For instance, in the case where the position on the upstream side of the noise reduction portion 407 is A, the position between the noise reduction portion 407 and the MPEG encoder 408 is B, and the position on the downstream side of the MPEG encoder 408 is C as shown in FIG. 10, the watermark detecting portions 415, 415A and the addition portions 406, 406A can be placed as follows.

In the case where the watermark detecting portion 415 is placed at A, it is possible to place the addition portion 406 at A or B and the addition portion 406A at C. To be more specific, it is possible to detect the watermark at A and re-mark it at A, B or C. The configuration in FIG. 8 is equivalent to the case where the watermark detecting portion 415 and the addition portion 406 are placed at A respectively. In the case where the watermark detecting portion 415 is placed at B, it is possible to place the addition portion 406 at B and the addition portion 406A at C. To be more specific, it is possible to detect the watermark at B and re-mark it at B or C. In the case where the watermark detecting portion 415A is placed at C, it is possible to place the addition portion 406A at C. To be more specific, it is possible to detect the watermark at C and re-mark it at C. The configuration in FIG. 9 is equivalent to this case.

As described above, in total, there are six configurations of the positions of the watermark detecting portions 415, 415A and the addition portions 406, 406A.

Of the six configurations of the positions, in the case where the watermark detecting portions 415, 415A are positioned more frontward than the addition portions 406, 406A, the watermark detecting portions 415, 415A can detect the watermark from the signal before having the watermark degraded by the noise reduction portion 407 or the MPEG encoder 408 placed between the watermark detecting portions 415, 415A and the addition portions 406, 406A. For this reason, the watermark is securely detected. In this case, the addition portions 406, 406A are positioned more backward than the watermark detecting portions 415, 415A, and so there is no possibility that the watermark embedded by the addition portions 406, 406A is degraded by the noise reduction portion 407 or the MPEG encoder 408 placed between the watermark detecting portions 415, 415A and the addition portions 406, 406A. Therefore, it is possible, by positioning the watermark detecting portions 415, 415A more frontward than the addition portions 406, 406A, to securely detect the watermark embedded in advance and also curb degradation of the newly embedded watermark.

For instance, in the case where the watermark detecting portion 415 is placed at A and the addition portion 406A is placed at C, the watermark detecting portion 415 placed at A detects the watermark from the video signal before going through the noise reduction portion 407 and the MPEG encoder 408. For this reason, the watermark is detected at the stage in which it is not degraded by the noise reduction portion 407 and the MPEG encoder 408. In addition, the MPEG stream having the watermark embedded therein by the addition portion 406A at C is outputted without going through the noise reduction portion 407 and the MPEG encoder 408. For this reason, there is no possibility that the watermark embedded by the addition portion 406A is degraded by the noise reduction portion 407 and the MPEG encoder 408.

Fifth Embodiment

Hereafter, a fifth embodiment of the electronic watermark embedding apparatus according to the present invention will be described by referring to FIG. 11.

Figure 11:
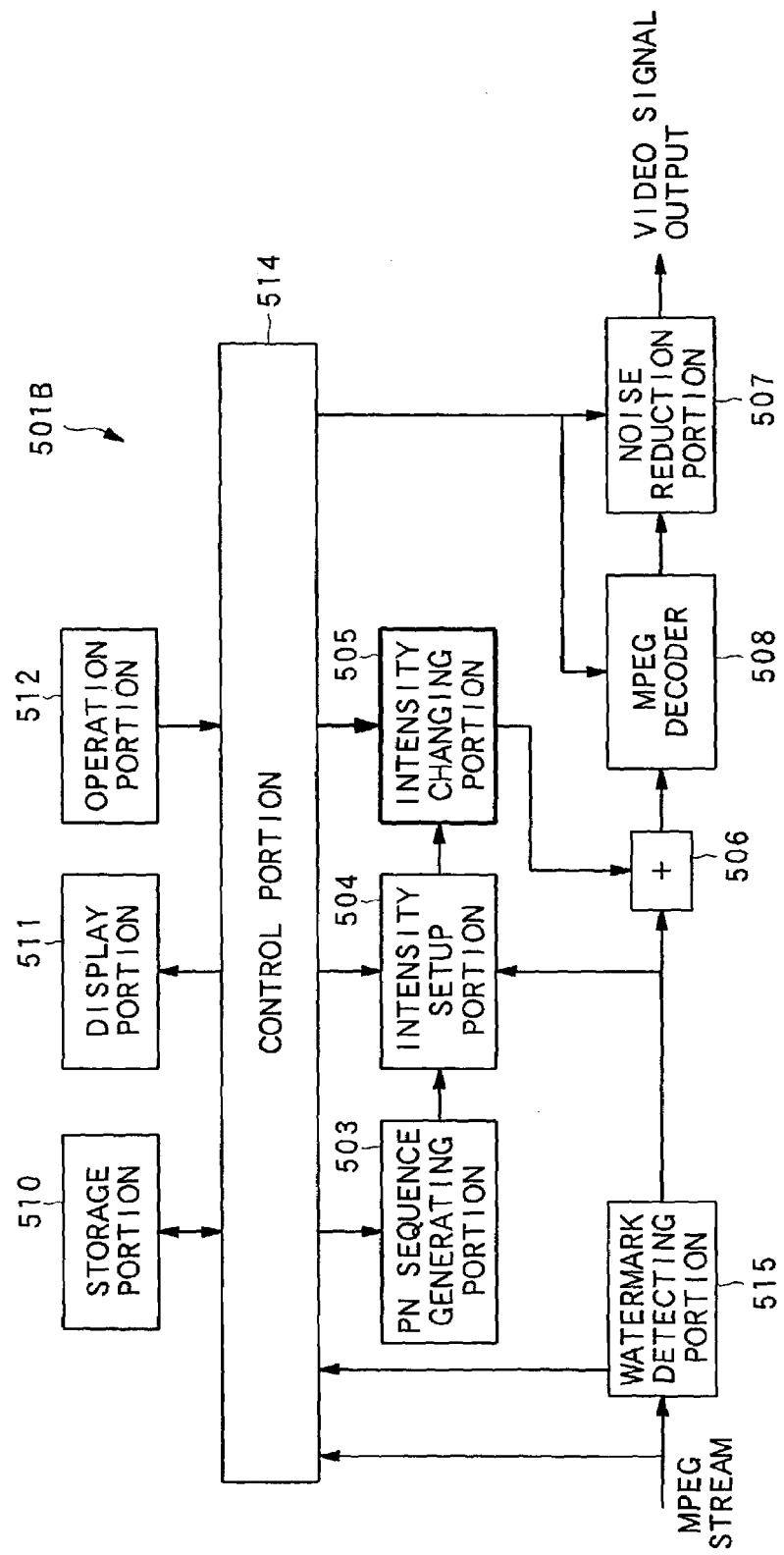
FIG. 11 is a block diagram showing the electronic watermark embedding apparatus according to a fifth embodiment.

FIG. 11 is a block diagram showing an electronic watermark embedding apparatus 501B according to the fifth embodiment. The electronic watermark embedding apparatus 501B re-embeds (re-marks) the watermark in the MPEG stream in which the watermark has already been embedded, and can be used as a part of the reproducing equipment for reproducing the image contents MPEG-compressed and recorded on the record medium.

As shown in FIG. 11, the electronic watermark embedding apparatus 501B has a watermark detecting portion 515 for detecting the watermark from the inputted MPEG stream, a PN sequence generating portion 503 for generating the PN sequence constituting the watermark (electronic watermark), an intensity setup portion 504 for amplifying the PN sequence outputted from the PN sequence generating portion 503 and setting up the intensity thereof, an intensity changing portion 505 for changing the intensity of the PN sequence, an addition portion 506 for adding the inputted MPEG stream to the PN sequence, an MPEG decoder 508 for decoding the MPEG stream, a noise reduction portion 507 for reducing the noise of the video signal, a storage portion 510 having the RAM and ROM, a display portion 511 for presenting the predetermined information to the operator, an operation portion 512 for receiving the operation of the operator, and a control portion 514 for controlling the above portions.

The watermark detecting portion 515 detects whether or not the watermark is embedded in the received MPEG stream and whether the watermark embedded in the MPEG stream indicates the one-generation duplication permission or the prohibition of the duplication so as to output the detection results to the control portion 514.

In the case where the watermark indicating the one-generation duplication permission is detected by the watermark detecting portion 515, the PN sequence generating portion 503 generates the PN sequence corresponding to the prohibition of the duplication. The intensity of the PN sequence is set up by the intensity setup portion 504 as with the intensity setup portion 404 of the first embodiment, and the intensity is further changed by the intensity changing portion 505. The PN sequence outputted from the intensity changing portion 505 is added to the MPEG stream by the addition portion 506.

The intensity changing portion 505 increases the intensity of the PN sequence, that is, the watermark outputted from the intensity setup portion 504 by an equivalent of only a few frames, and outputs it to the addition portion 506. As for the operation of the intensity changing portion 505, the same operation as that of the intensity changing portion 405 according to the first embodiment may be adopted. The MPEG stream having the watermark added thereto is decoded by the MPEG decoder 508 to become the video signal, and further has the noise reduction process performed thereto by the noise reduction portion 507 so as to be outputted.

Thus, in the case where embedding of the watermark indicating the one-generation duplication permission is detected, the electronic watermark embedding apparatus 501B can re-mark in the image contents the watermark indicating the prohibition of the duplication having such high intensity as to be securely detected. In this case, the watermark to be re-marked by the electronic watermark embedding apparatus 501B is the equivalent of only a few frames, and so the influence on the image contents is so slight that it does not substantially degrade the image.

In the case where the watermark indicating the one-generation duplication permission and the watermark indicating the prohibition of the duplication are not detected by the watermark detecting portion 515, the contents are duplicable and so they are outputted as the MPEG stream without having the watermark re-marked by the addition portion 506.

In the case where the watermark indicating the prohibition of the duplication is detected by the watermark detecting portion 515, the control portion 514 exerts control to prohibit the reproducing.

Sixth Embodiment

Figure 12:
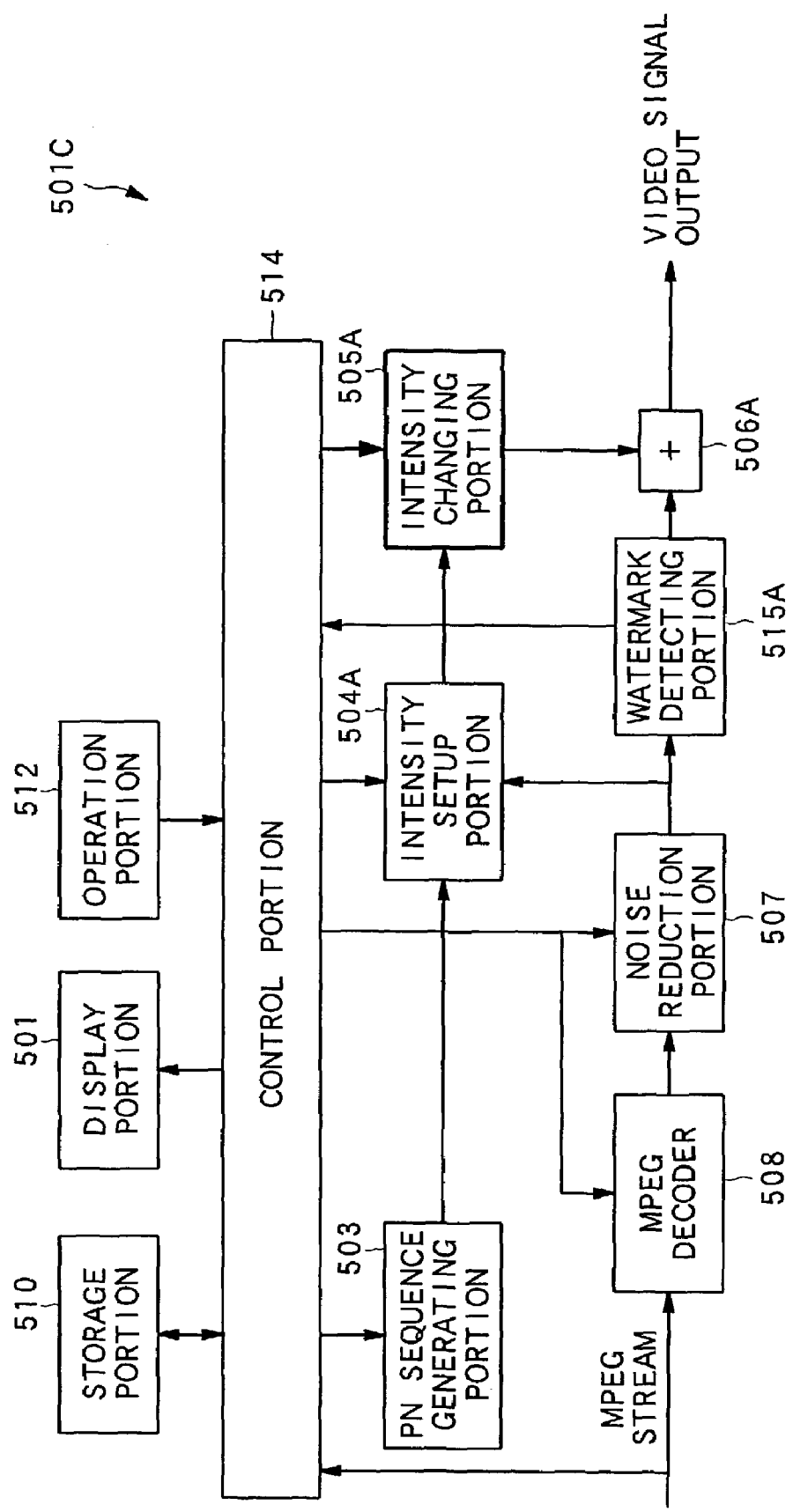
FIG. 12 is a block diagram showing an electronic watermark embedding apparatus according to a sixth embodiment.

Hereafter, a sixth embodiment of the electronic watermark embedding apparatus according to the present invention will be described by referring to FIG. 12. In FIG. 12, the elements corresponding to the configuration of the fifth embodiment are given the same symbols and a description thereof will be omitted.

FIG. 12 is a block diagram showing an electronic watermark embedding apparatus 501C according to the sixth embodiment. The electronic watermark embedding apparatus 501C re-embeds (re-marks) the watermark in the MPEG stream in which the watermark has already been embedded, and can be used as a part of the reproducing equipment for reproducing the image contents MPEG-compressed and recorded on the record medium as the electronic watermark embedding apparatus 501B.

As shown in FIG. 12, the electronic watermark embedding apparatus 501C has a watermark detecting portion 515A for detecting the watermark from the video signal generated by performing MPEG decoding by the MPEG encoder 508 and the noise reduction by the noise reduction portion 507 to the inputted MPEG stream.

The watermark detecting portion 515A detects whether or not the watermark is embedded in the received video signal and whether the watermark embedded in the video signal indicates the one-generation duplication permission or the prohibition of the duplication so as to output the detection results to the control portion 514.

In the case where the watermark indicating the one-generation duplication permission is detected by the watermark detecting portion 515A, the PN sequence generating portion 503 generates the PN sequence corresponding to the prohibition of the duplication. The intensity of the PN sequence is set up by the intensity setup portion 504A as with the intensity setup portion 404 of the first embodiment, and the intensity is further changed by the intensity changing portion 505A. The PN sequence outputted from the intensity changing portion 505A is added to the video signal by the addition portion 506A.

The intensity changing portion 505A increases the intensity of the PN sequence, that is, the watermark outputted from the intensity setup portion 504A by an equivalent of only a few frames, and outputs it to the addition portion 506A. As for the operation of the intensity changing portion 505A, the same operation as that of the intensity changing portion 405 according to the first embodiment may be adopted.

As described above, the electronic watermark embedding apparatus 501C has the MPEG decoding process by the MPEG decoder 508 and the noise reduction by the noise reduction portion 507 performed to the video signal so that, in the case where embedding of the watermark indicating the one-generation duplication permission in the generated video signal is detected, it superimposes the PN sequence, that is, the watermark of the increased intensity thereon.

The electronic watermark embedding apparatus 501C thereby re-marks the watermark after the decoding process and noise reduction process which consequently degrade the watermark, so that it does not degrade the watermark. Therefore, the electronic watermark embedding apparatus 501C has an advantage that it can more appropriately manage the intensity and state of the watermark of the MPEG stream outputted as the video signal.

In the case where the watermark indicating the one-generation duplication permission and the watermark indicating the prohibition of the duplication are not detected by the watermark detecting portion 515A, the contents are duplicable and so they are outputted as the MPEG stream without having the watermark re-marked by the addition portion 506A.

In the case where the watermark indicating the prohibition of the duplication is detected by the watermark detecting portion 515A, the control portion 514 exerts control to prohibit the reproducing.

Here, in the electronic watermark embedding apparatus 501B shown in FIG. 11, the watermark detecting portion 515 and the addition portion 506 are positioned more upstream than the MPEG decoder 508. To be more specific, the electronic watermark embedding apparatus 501B detects and re-marks the watermark of the MPEG stream before being MPEG-decoded. In addition, in the electronic watermark embedding apparatus 501C shown in FIG. 12, the watermark detecting portion 515A and the addition portion 506A are positioned more downstream than the noise reduction portion 507. To be more specific, the electronic watermark embedding apparatus 501C detects and re-marks the watermark of the video signal generated by performing the MPEG decoding and noise reduction to the MPEG stream.

Thus, the electronic watermark embedding apparatuses 501B and 501C shown in FIGS. 11 and 12 detect and re-mark the watermark at the same position in reference to the positions of the noise reduction portion 507 and the MPEG encoder 508.

Figure 13:
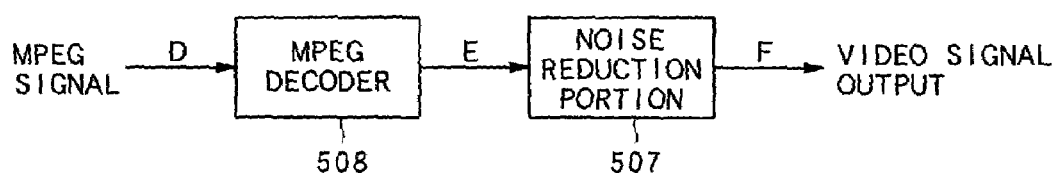
FIG. 13 is a diagram showing positions of the watermark detecting portion and the addition portion.

However, the electronic watermark embedding apparatus according to the present invention is not limited to such configuration. For instance, in the case where the position on the upstream side of the MPEG decoder 508 is D, the position between the MPEG decoder 508 and the noise reduction portion 507 is E, and the position on the downstream side of the noise reduction portion 507 is F as shown in FIG. 13, the watermark detecting portions 515, 515A and the addition portions 506, 506A can be placed as follows.

In the case where the watermark detecting portion 515 is placed at D, it is possible to place the addition portion 506A at E or F and the addition portion 506A at D. To be more specific, it is possible to detect the watermark at D and re-mark it at D, E or F. The configuration in FIG. 11 is equivalent to the case where the watermark detecting portion 515 and the addition portion 506 are placed at D respectively. In the case where the watermark detecting portion 515 is placed at E, it is possible to place the addition portion 506A at E and the addition portion 506A at F. To be more specific, it is possible to detect the watermark at E and re-mark it at E or F. In the case where the watermark detecting portion 515A is placed at F, it is possible to place the addition portion 506A at F. To be more specific, it is possible to detect the watermark at F and re-mark it at F. The configuration in FIG. 12 is equivalent to this case.

As described above, in total, there are six configurations of the positions of the watermark detecting portions 515, 515A and the addition portions 506, 506A.

Of the six configurations of the positions, in the case where the watermark detecting portions 515, 515A are positioned more frontward than the addition portions 506, 506A, the watermark detecting portions 515, 515A can detect the watermark from the signal before having the watermark degraded by the noise reduction portion 507 or the MPEG encoder 508 placed between the watermark detecting portions 515, 515A and the addition portions 506, 506A. For this reason, the watermark is securely detected. In this case, the addition portions 506, 506A are positioned more backward than the watermark detecting portions 515, 515A, and so there is no possibility that the watermark embedded by the addition portions 506, 506A is degraded by the noise reduction portion 507 or the MPEG encoder 508 placed between the watermark detecting portions 515, 515A and the addition portions 506, 506A. Therefore, it is possible, by positioning the watermark detecting portions 515, 515A more frontward than the addition portions 506, 506A, to securely detect the watermark embedded in advance and also curb degradation of the newly embedded watermark.

For instance, in the case where the watermark detecting portion 515 is placed at D and the addition portion 506A is placed at F, the watermark detecting portion 515 placed at D detects the watermark from the MPEG stream before going through the noise reduction portion 507 and the MPEG decoder 508. For this reason, the watermark is detected at the stage in which it is not degraded by the noise reduction portion 507 and the MPEG decoder 508. In addition, the MPEG stream having the watermark embedded therein by the addition portion 506A at F is outputted without going through the noise reduction portion 507 and the MPEG decoder 508. For this reason, there is no possibility that the watermark embedded by the addition portion 506A is degraded by the noise reduction portion 507 and the MPEG decoder 508.

The above-mentioned embodiments have the configuration wherein the PN sequence constituting the watermark is added to the luminance values set up for the respective pixels. However, the present invention is not limited thereto, and it is also possible to add the PN sequence constituting the watermark to other values set up for the respective pixels.

The PN sequence constituting the watermark is not limited to the M sequence. Another random sequence such as Gold symbols may be used as the PN sequence constituting the watermark.

The embodiments took the case of constituting the watermark by the PN sequence as an example. However, the present invention is not limited thereto. For instance, it is also possible to constitute the watermark by the random or nearly random symbols or other signals in which the symbols having regularity not easily determinable are arranged.

The embodiments took the case of associating the symbols constituting the PN sequence with the pixels of the image one-on-one as an example. However, the present invention is not limited thereto. For instance, it is also possible to divide the image into a plurality of areas comprised of a plurality of mutually adjacent pixels and associate the symbols constituting the PN sequence with the areas one-on-one. Here, an example is taken as to the case of embedding the PN sequence "0101 . . ." constituting the watermark indicating the prohibition of the duplication into the image divided into square areas comprised of four mutually connected pixels. In this case, "0" is added to the luminance values of all the four pixels included in the area placed first in the image. Furthermore, "1" is added to the luminance values of all the four pixels included in the area placed second in the image. In this way, the symbols constituting the PN sequence are associated with the areas comprised of the plurality of pixels one-on-one so that the watermark can remain in the digital image even if the digital image is filtered or compressed.

It is a matter of course that the present invention is applicable to package media such as the video tape or DVD other than broadcasting media.

Seventh Embodiment

Hereafter, a seventh embodiment of the electronic watermark embedding apparatus according to the present invention will be described by referring to FIGS. 14 and 2 to 5.

Figure 14:
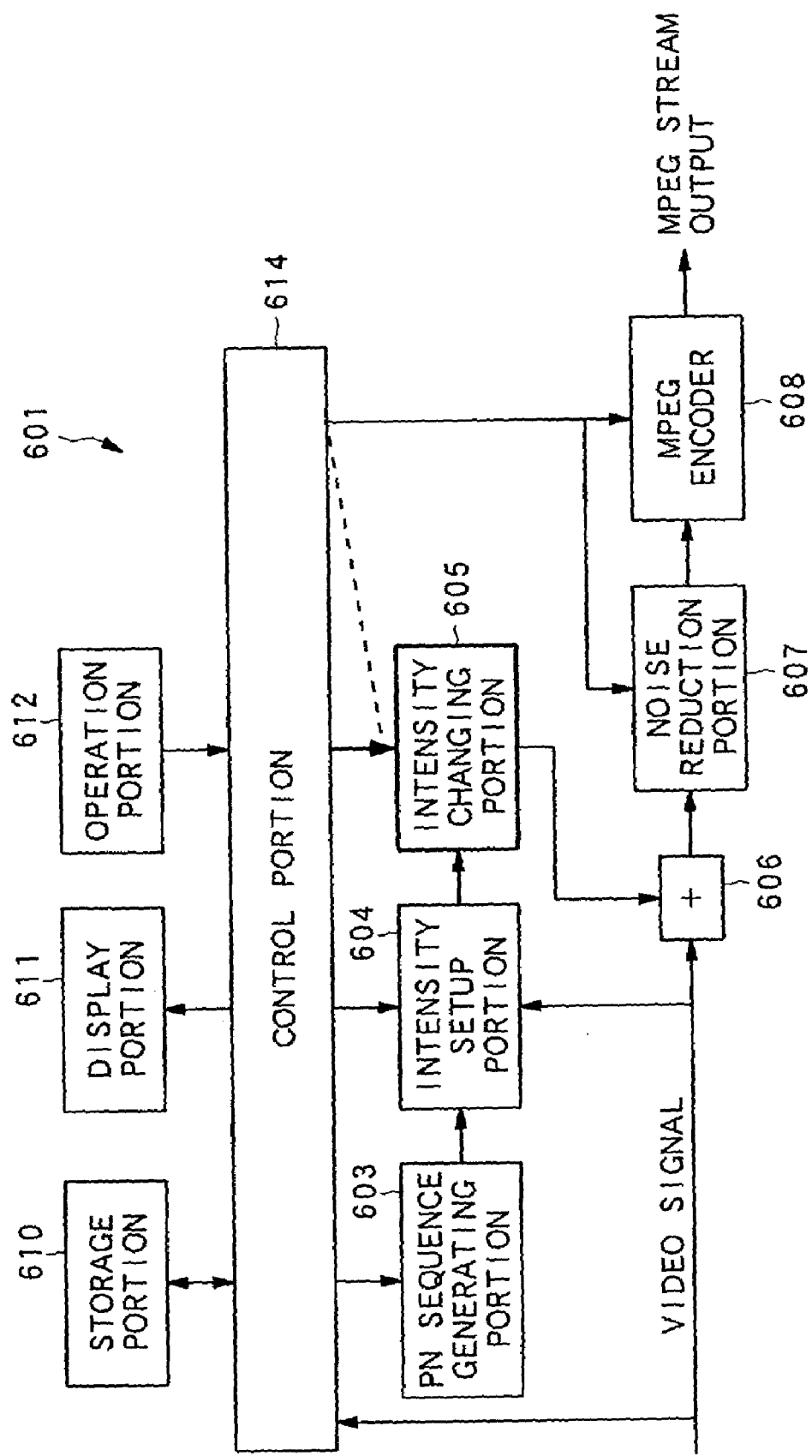
FIG. 14 is a block diagram showing an electronic watermark embedding apparatus according to a seventh embodiment.

FIG. 14 is a block diagram showing an electronic watermark embedding apparatus 601 according to the seventh embodiment. The electronic watermark embedding apparatus 601 embeds a watermark (electronic watermark) in a video signal which is a base band.

As shown in FIG. 14, the electronic watermark embedding apparatus 601 has a PN sequence generating portion 603 for generating a PN (Pseudorandom Noise) sequence constituting the watermark (electronic watermark) used as information on limitation of duplication of the image contents, an intensity setup portion 604 for amplifying the PN sequence outputted from the PN sequence generating portion 603 and setting up the intensity thereof, an intensity changing portion 605 for changing the intensity of the PN sequence, an addition portion 606 for adding the video signal to the PN sequence, a noise reduction portion 607 for reducing the noise of the video signal, an MPEG encoder 608 for compression-encoding the data of the image contents, a storage portion 610 having an RAM and an ROM, a display portion 611 for presenting predetermined information to an operator, an operation portion 612 for receiving an operation of the operator, and a control portion 614 for controlling the above portions.

The electronic watermark embedding apparatus 601 can be used as a part of broadcasting equipment of a broadcast station for instance. In this case, it is possible to distribute the image by amplifying an MPEG stream outputted from the MPEG encoder 608 with a video signal outputting apparatus and sending it via an antenna.

The electronic watermark embedding apparatus 601 can be used as a part of a recording apparatus used by a motion picture company for instance. In this case, it is possible to embed the watermark into the contents having no watermark so as to record the contents on a record medium such as an optical disk or a video tape.

Next, a description will be given by referring to FIGS. 2 to 5 as to the watermark comprised of the PN sequence generated by the PN sequence generating portion 603.

A digital image includes the information representing luminance of each image constituting the digital image. The information representing the luminance is a numerical value of 4 to 8 bits or so for instance, and is corresponding to a pixel constituting the image respectively. To be more specific, the numerical value representing the luminance is individually set up for each pixel (hereafter, the numerical value representing the luminance of the pixel is referred to as a "luminance value"). To describe it concretely by using FIG. 2, an image P1 in FIG. 2 is one of the images constituting the digital image, and a, b, c, d . . . in the image P1 indicate the luminance values set up for the respective pixels.

The watermark is comprised of a signal generated based on a predetermined rule, that is, the PN sequence in this embodiment for instance, and is embedded into the image by adding the symbols of the PN sequence to the luminance values of the pixels respectively. For instance, "0011 . . . " in FIG. 2 is the PN sequence constituting the watermark. If this PN sequence is added to the luminance values a, b, c, d . . . in the image P1, the luminance values become a, b, c+1, d+1 . . . as shown in FIG. 3. Thus, the watermark is embedded in each image constituting the digital image.

The PN sequence constituting the watermark is a sequence of pseudorandom signals such as an M sequence for instance, and is generated by giving an initial value to a polynomial (generating equation) for generating the PN sequence. In this embodiment, the polynomial (generating equation) for generating the PN sequence is embodied as a PN sequence generating circuit 101 shown in FIG. 4 for instance. The PN sequence generating circuit 101 is comprised of shift registers 1A to 1D and an adder 1E, and is provided to the PN sequence generating portion 603. As for the PN sequence which are actually used, those having a larger number of the shift registers are used so that a sequence period will be longer.

According to this embodiment, two types of mutually different PN sequences are generated, where one of them is used as the watermark for indicating the permission of one-generation duplication and the other is used as the watermark for indicating the prohibition of the duplication. The PN sequence has an arrangement of random symbols changed by changing one or both of the polynomial and initial value. Therefore, it is possible to generate a different PN sequence by changing one or both of the polynomial and initial value.

For instance, the PN sequence to be used as the watermark for indicating the permission of the one-generation duplication is generated by the PN sequence generating circuit 101 shown in FIG. 4. On the other hand, the PN sequence to be used as the watermark for indicating the prohibition of the duplication is generated by a PN sequence generating circuit 102 shown in FIG. 5. The PN sequence generating circuit 102 shown in FIG. 5 embodies the polynomial (generating equation) different from the polynomial (generating equation) corresponding to the PN sequence generating circuit 101, and is comprised of shift registers 2A to 2D and an adder 2E. The PN sequence generating circuit 102 is also provided to the PN sequence generating portion 603.

It is apparent that the polynomial corresponding to the PN sequence generating circuit 101 is different from the polynomial corresponding to the PN sequence generating circuit 102 because the connections of the shift registers and the adder are different between the PN sequence generating circuit 101 and the PN sequence generating circuit 102. Thus, it is possible to generate the watermark for indicating the permission of the one-generation duplication and the watermark for indicating the prohibition of the duplication by using the two PN sequence generating circuits different in the connection or constitution (that is, two polynomials of different structures) respectively.

It is also possible, by using only the PN sequence generating circuit 101 shown in FIG. 4, to generate the watermark for indicating the permission of the one-generation duplication and the watermark for indicating the prohibition of the duplication respectively. In this case, two kinds of the initial values to be given to the PN sequence generating circuit 101 are prepared. One of the two kinds of the initial values is given to the PN sequence generating circuit 101 so as to generate the PN sequence constituting the watermark for indicating the permission of the one-generation duplication, and the other initial value is given to the same PN sequence generating circuit 101 so as to generate the PN sequence constituting the watermark for indicating the prohibition of the duplication. For instance, when generating the PN sequence constituting the watermark for indicating the permission of the one-generation duplication, an initial value "0011" is inputted to the shift registers 1A to 1D. On the other hand, when generating the PN sequence constituting the watermark for indicating the prohibition of the duplication, an initial value "0101" is inputted to the shift registers 1A to 1D.

Next, the operation of the intensity setup portion 604 will be described.

As shown in FIG. 14, the intensity setup portion 604 has the video signal and the PN sequence outputted from the PN sequence generating portion 603 inputted thereto. And the intensity setup portion 604 sets the PN sequence from the PN sequence generating portion 603 at appropriate intensity based on the inputted video signal. To be more specific, the intensity setup portion 604 detects whether the luminance values set respectively to the pixels constituting one image have changed greatly or slightly. If the luminance values have changed greatly, the image has a complicated pattern for instance, so that the watermark does not become prominent even if embedded therein. Thus, if the luminance values have changed greatly, the intensity setup portion 604 sets the PN sequence, that is, the watermark outputted from the PN sequence generating portion 603 at a rather high intensity. For instance, in the case where the PN sequence is "0101 . . . ," the intensity setup portion 604 sets it at "0202" or "0303." And the intensity setup portion 604 outputs the PN sequence which is set to the intensity changing portion 605.

If the luminance values set to the pixels constituting one image respectively have changed slightly, the image is a flat image for instance, so that the watermark is apt to be prominent. Thus, if the luminance values have changed slightly, the intensity setup portion 604 outputs the PN sequence outputted from the PN sequence generating portion 603 as-is to the intensity changing portion 605.

Next, the operation of the intensity changing portion 605 will be described.

The PN sequence outputted from the intensity setup portion 604 has its intensity changed by the intensity changing portion 605, and is outputted to the addition portion 606. In the addition portion 606, the video signal has the PN sequence from the intensity changing portion 605 superimposed thereon, and the watermark is embedded in the image.

The intensity changing portion 605 changes the intensity of the PN sequence outputted from the intensity setup portion 604 according to the intensity of the noise reduction process in the noise reduction portion 607 and the bit rate of compression encoding or a compression rate of the compression encoding in the MPEG encoder 608. The intensity changing portion 605 thereby prevents a state of being unable to read the watermark due to the noise reduction process in the noise reduction portion 607 and a compression encoding process in the MPEG encoder 608.

To be more specific, in the case of producing the contents based on an old source, the intensity of the noise reduction process may be increased in order to eliminate the noise component included in the source. There are also the cases where the bit rate in performing the compression encoding is set low based on quality of the image, required recording capacity and so on. In these cases, there is a possibility that the watermark embedded in the contents is degraded by the noise reduction portion and compression encoding process, resulting in difficulty in detecting the watermark on the reproduction.

Thus, according to the present invention, the intensity of the noise reduction process works with the intensity of the watermark, and the bit rate of the compression encoding works with the intensity of the watermark. As shown in FIG. 14, the control portion 614 controls the noise reduction portion 607 and the MPEG encoder 608, and also controls the intensity of the noise reduction process in the noise reduction portion 607 and the bit rate of the compression encoding in the MPEG encoder 608. A control signal for controlling the intensity of the noise reduction process and the bit rate of compression encoding is also given to the intensity changing portion 605, and an amplification degree of the intensity changing portion 605 changes based on the control signal.

Thus, the intensity changing portion 605 is controlled by the control portion 614 to change the intensity of the PN sequence, that is, the watermark outputted from the intensity setup portion 604 in conjunction with the intensity of the noise reduction process and the bit rate of compression encoding, and it increases the intensity of the watermark as the intensity of the noise reduction process becomes higher and also increases the intensity of the watermark as the bit rate of the compression encoding becomes lower. In this way, the electronic watermark embedding apparatus 601 can embed the watermark with such intensity as to counteract the influence of the noise reduction process in the noise reduction portion 607 and the compression encoding in the MPEG encoder 608, and so the watermark is securely detected when the image contents having the watermark embedded therein is reproduced.

It generally happens that, in the case of increasing the intensity of the noise reduction process or in the case of decreasing the bit rate of the compression encoding, the image quality is often degraded. Therefore, the portion in which the intensity of the noise reduction process is increased or the portion in which the bit rate of the compression encoding is decreased often has a degraded image from the beginning due to the processes so that, even if the intensity of the watermark is increased in these portions, the degradation of the image quality due to the watermark is not prominent.

A period in which the intensity changing portion 605 increases the intensity of the watermark may be a short period with fixed intervals (fixed time intervals) such as an equivalent of only a few frames (1 to 3 frames) for instance in the period of high intensity of the noise reduction process or in the period of low bit rate of the compression encoding. To be more specific, the intensity changing portion 605 is controlled by the control portion 614 to intermittently increase just by the equivalent of a few frames the intensity of the watermark reflecting the intensity of the noise reduction process and the bit rate of the compression encoding. The watermark of which intensity is thus increased intermittently or pulse-like is not as prominent on the image as the watermark of which intensity is increased over the period of high intensity of the noise reduction process and the period of low bit rate of the compression encoding, yet it is securely detected.

In addition, the period in which the intensity changing portion 605 increases the intensity of the watermark may be the equivalent of a few frames at random intervals or unfixed intervals according to some rule (random or unfixed time intervals) in the period of high intensity of the noise reduction process or in the period of low bit rate of the compression encoding. This is because the watermark is less prominent on the image when its intensity is increased at the random or unfixed time intervals than when increased at the fixed intervals.

The period in which the intensity changing portion 605 increases the intensity of the watermark may be the equivalent of a few frames in accordance with the change in the image in the period of high intensity of the noise reduction process or in the period of low bit rate of the compression encoding. For instance, it is also possible to increase the intensity of the watermark by the equivalent of a few frames in timing of significant change of the image time-wise such as changing of scenes (switching of the scenes), timing of significant change of the image in the frame such as the image having many strong edges, and timing of fierce move of the image such as a large motion vector.

Eighth Embodiment

Figure 15:
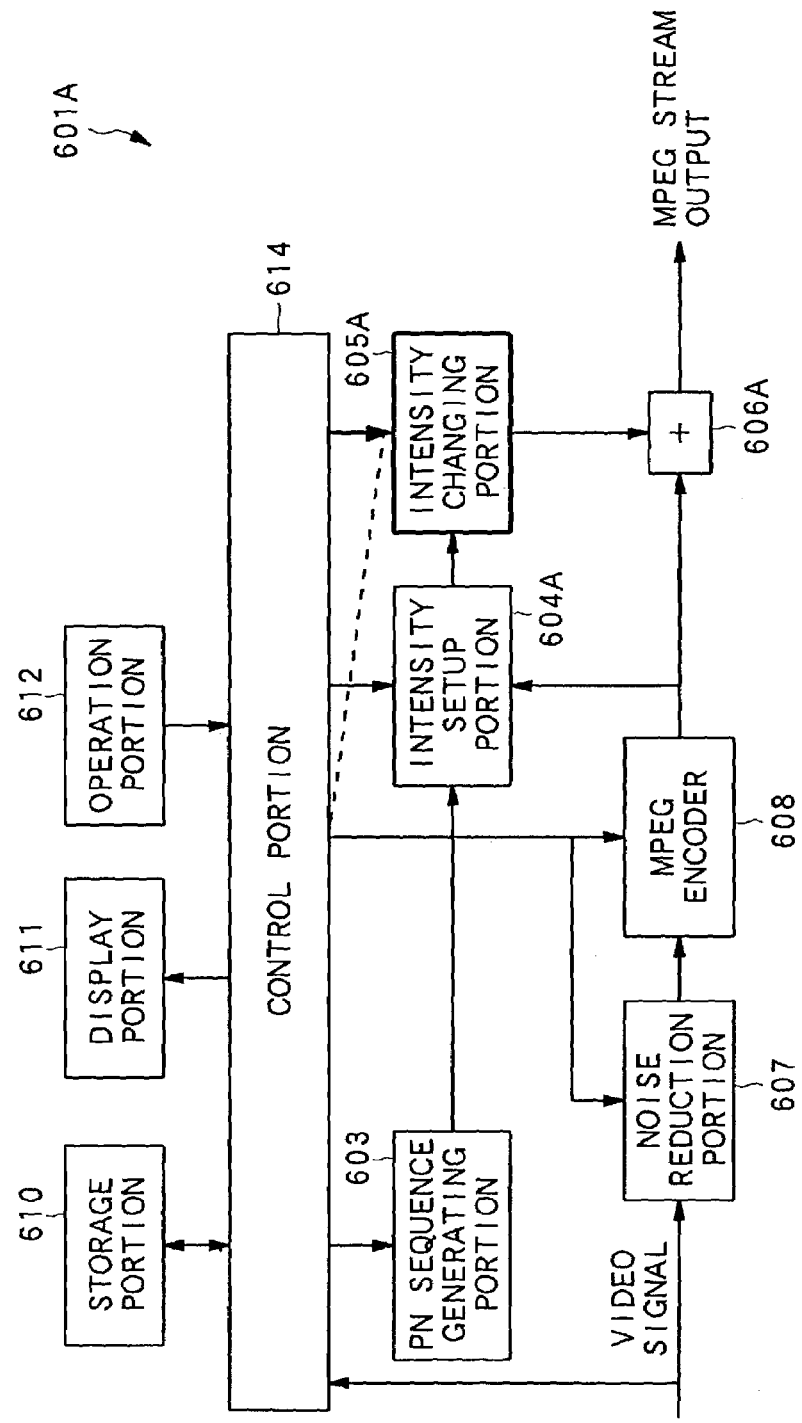
FIG. 15 is a block diagram showing the electronic watermark embedding apparatus according to an eighth embodiment.

Hereafter, a second embodiment of the electronic watermark embedding apparatus according to the present invention will be described by referring to FIG. 15. In FIG. 15, the elements corresponding to the configuration of the seventh embodiment are given the same symbols and a description thereof will be omitted.

FIG. 15 is a block diagram showing an electronic watermark embedding apparatus 601A according to the second embodiment. The electronic watermark embedding apparatus 601A embeds the watermark in the MPEG stream having MPEG-encoded the image contents, and can be used, for instance, as a part of a recorder for recording the video signal sent from a broadcast station on the record medium.

As shown in FIG. 15, the electronic watermark embedding apparatus 601A according to the second embodiment has the noise reduction process performed to the video signal by the noise reduction portion 607, and further has the compression encoding process performed by the MPEG encoder 608 so as to input the MPEG stream obtained by the compression encoding to an intensity setup portion 604A and an addition portion 606A. Therefore, the intensity setup portion 604A sets up the intensity of the PN sequence based on this MPEG stream. The addition portion 606A adds the PN sequence to this MPEG stream.

An intensity changing portion 605A is controlled by the control portion 614 to change the intensity of the watermark outputted from the intensity setup portion 604A in conjunction with the intensity of the noise reduction process and the bit rate of compression encoding, and it increases the intensity of the watermark as the intensity of the noise reduction process becomes higher and also increases the intensity of the watermark as the bit rate of the compression encoding becomes lower. As for the operation of the intensity changing portion 605A, the same operation as that of the intensity changing portion 605 according to the seventh embodiment may be adopted.

As described above, the electronic watermark embedding apparatus 601A has the noise reduction process by the noise reduction portion 607 and the compression encoding by the MPEG encoder 608 performed to the video signal so as to superimpose the PN sequence, that is, the watermark on a generated MPEG stream. Normally, in the case where the intensity of the noise reduction process by the noise reduction portion 607 is high or in the case where the bit rate of the compression encoding by the MPEG encoder 608 is low, the image having undergone the noise reduction process or the compression encoding is apt to be flat. For this reason, in the case where the state of high intensity of the noise reduction process or the state of low bit rate of compression encoding by the MPEG encoder 608 continues, there is a possibility that the intensity of the watermark set up by the intensity setup portion 604A will be kept low for a long time. However, as described above, the intensity changing portion 605A changes the intensity of the watermark according to the intensity of the noise reduction process by the noise reduction portion 607 or the bit rate of the compression encoding by the MPEG encoder 608. Therefore, even if the state of high intensity of the noise reduction process or the state of low bit rate of compression encoding by the MPEG encoder 608 continues, the intensity of the watermark will not be kept low. Therefore, the watermark is securely detected when the image contents having the watermark embedded therein are reproduced.

The electronic watermark embedding apparatus 601A has the watermark embedded after the noise reduction process and the compression encoding process which consequently degrade the watermark, so that there is no possibility of degrading the watermark by the noise reduction process and the compression encoding process. Therefore, the electronic watermark embedding apparatus 601A has an advantage that it can more appropriately manage the intensity and state of the watermark of the video signal outputted as the MPEG stream.

Ninth Embodiment

Figure 16:
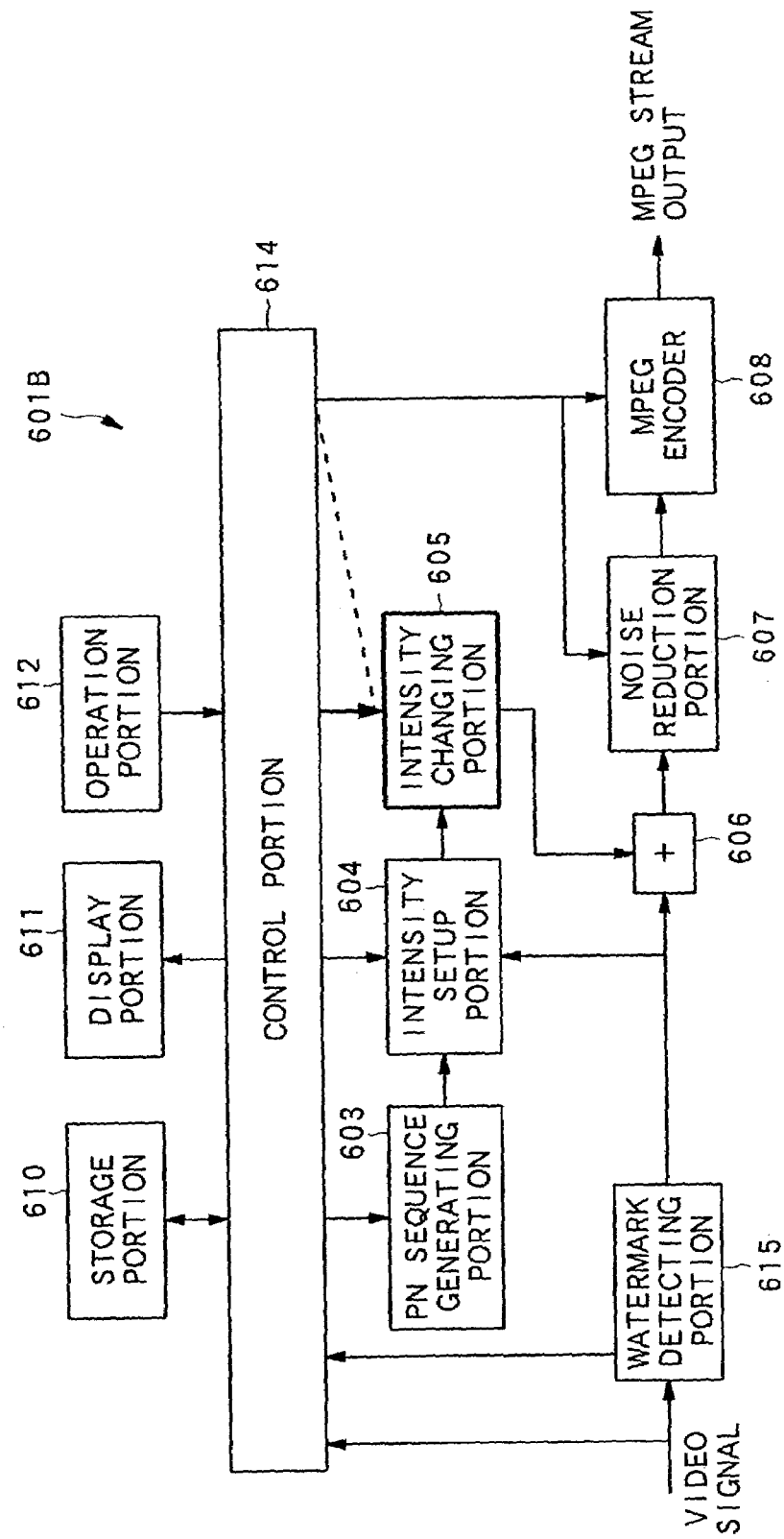
FIG. 16 is a block diagram showing the electronic watermark embedding apparatus according to a ninth embodiment.

Hereafter, a third embodiment of the electronic watermark embedding apparatus according to the present invention will be described by referring to FIG. 16. In FIG. 16, the elements corresponding to the configuration of the seventh embodiment are given the same symbols and a description thereof will be omitted.

FIG. 16 is a block diagram showing an electronic watermark embedding apparatus 601B according to the third embodiment. The electronic watermark embedding apparatus 601B re-embeds (re-marks) the watermark in the video signal referred to as the base band in which the watermark has already been embedded, and can be used as a part of the broadcasting equipment of the broadcast station or as a part of the recording equipment of the motion picture company as with the electronic watermark embedding apparatus 601.

As shown in FIG. 16, the electronic watermark embedding apparatus 601B has a watermark detecting portion 615 for detecting the watermark from an inputted video signal.

Before recording a received video signal on the record medium such as the optical disk, the watermark detecting portion 615 detects whether or not the watermark is embedded in the video signal and whether the watermark embedded in the video signal indicates the one-generation duplication permission or the prohibition of the duplication so as to output the detection results to the control portion 614.

In the case where the watermark indicating the one-generation duplication permission is detected by the watermark detecting portion 615, the PN sequence generating portion 603 generates the PN sequence corresponding to the prohibition of the duplication. The intensity of the PN sequence is set up by the intensity setup portion 604 as with the seventh embodiment, and the intensity is further changed by the intensity changing portion 605. The PN sequence outputted from the intensity changing portion 605 is added to the video signal by the addition portion 606.

The intensity changing portion 605 is controlled by the control portion 614 to change the intensity of the watermark outputted from the intensity setup portion 604 in conjunction with the intensity of the noise reduction process and the bit rate of compression encoding, and it increases the intensity of the watermark as the intensity of the noise reduction process becomes higher and also increases the intensity of the watermark as the bit rate of the compression encoding becomes lower. As for the operation of the intensity changing portion 605, the same operation as that of the intensity changing portion 605 according to the seventh embodiment may be adopted. The video signal in which the watermark is embedded has the noise reduction process by the noise reduction portion 607 and the MPEG encoding by the MPEG encoder 608 performed thereto so as to be outputted as the MPEG stream.

Thus, in the case of detecting that the watermark indicating the one-generation duplication permission is embedded, the electronic watermark embedding apparatus 601B can re-mark the watermark indicating the prohibition of the duplication in the image contents with such intensity as to counteract the influence of the noise reduction process in the noise reduction portion 607 and the compression encoding in the MPEG encoder 608. Therefore, the re-marked watermark is securely detected.

In the case where the watermark indicating the one-generation duplication permission and the watermark indicating the prohibition of the duplication are not detected by the watermark detecting portion 615, the contents are duplicable and so they are outputted as the MPEG stream without having the watermark re-marked by the addition portion 606.

In the case where the watermark indicating the prohibition of the duplication is detected by the watermark detecting portion 615, the control portion 614 exerts control to prohibit the recording.

Tenth Embodiment

Figure 17:
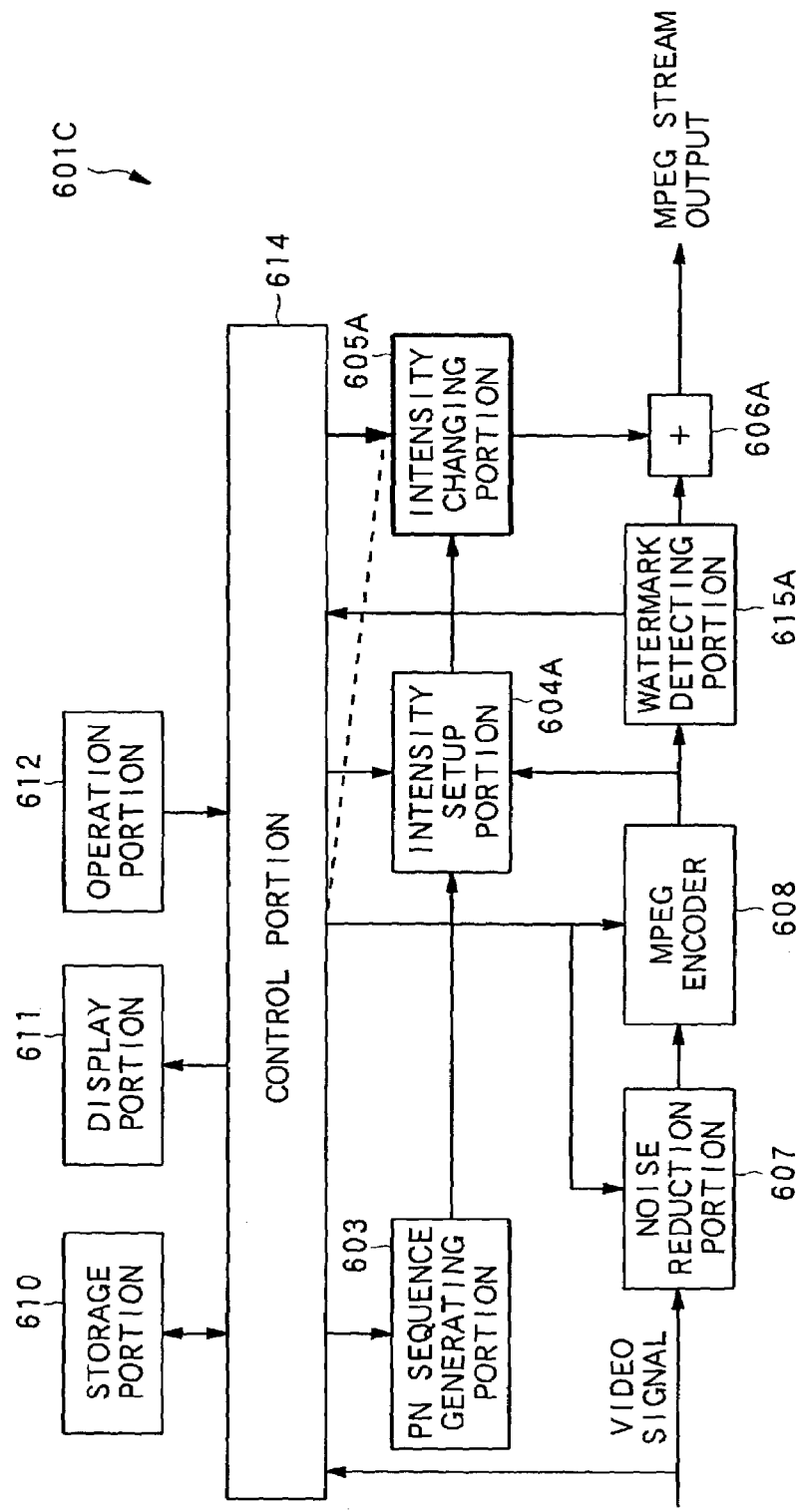
FIG. 17 is a block diagram showing the electronic watermark embedding apparatus according to a tenth embodiment.

Hereafter, a tenth embodiment of the electronic watermark embedding apparatus according to the present invention will be described by referring to FIG. 17. In FIG. 17, the elements corresponding to the configuration of the seventh embodiment are given the same symbols and a description thereof will be omitted.

FIG. 17 is a block diagram showing an electronic watermark embedding apparatus 601C according to the fourth embodiment. The electronic watermark embedding apparatus 601C re-embeds (re-marks) the watermark in the MPEG stream in which the watermark has already been embedded, and can be used as a part of the recording equipment for recording the video signal sent from the broadcast station on the record medium as with the electronic watermark embedding apparatus 601A.

As shown in FIG. 17, the electronic watermark embedding apparatus 601C has a watermark detecting portion 615A for detecting the watermark from the MPEG stream generated by performing the noise reduction process by the noise reduction portion 607 and the compression encoding process by the MPEG encoder 608 to the inputted video signal.

Before recording the received MPEG stream on the record medium such as the optical disk, the watermark detecting portion 615A detects whether or not the watermark is embedded in the MPEG stream and whether the watermark embedded in the MPEG stream indicates the one-generation duplication permission or the prohibition of the duplication so as to output the detection results to the control portion 614.

In the case where the watermark indicating the one-generation duplication permission is detected by the watermark detecting portion 615A, the PN sequence generating portion 603 generates the PN sequence corresponding to the prohibition of the duplication. The intensity of the PN sequence is set up by the intensity setup portion 604A as with the intensity setup portion 604 of the seventh embodiment, and the intensity is further changed by the intensity changing portion 605A. The PN sequence outputted from the intensity changing portion 605A is added to the MPEG stream by the addition portion 606A.

The intensity changing portion 605A is controlled by the control portion 614 to change the intensity of the watermark outputted from the intensity setup portion 604A in conjunction with the intensity of the noise reduction process and the bit rate of compression encoding, and it increases the intensity of the watermark as the intensity of the noise reduction process becomes higher and also increases the intensity of the watermark as the bit rate of the compression encoding becomes lower. As for the operation of the intensity changing portion 605A, the same operation as that of the intensity changing portion 605 according to the seventh embodiment may be adopted Thus, the intensity changing portion 605A changes the intensity of the watermark according to the intensity of the noise reduction process by the noise reduction portion 607 or the bit rate of the compression encoding by the MPEG encoder 608. Therefore, even in the case where the state of high intensity of the noise reduction process or the state of low bit rate of compression encoding by the MPEG encoder 608 continues, the intensity of the watermark will not be kept low. Thus, the watermark is securely detected when the image contents having the watermark embedded therein are reproduced.

The electronic watermark embedding apparatus 601C re-marks the watermark after the noise reduction process and the compression encoding process which consequently degrade the watermark, and so it does not degrade the watermark by the noise reduction process and the compression encoding process. Therefore, the electronic watermark embedding apparatus 601C has an advantage that it can more appropriately manage the intensity and state of the watermark of the video signal outputted as the MPEG stream.

In the case where the watermark indicating the one-generation duplication permission and the watermark indicating the prohibition of the duplication are not detected by the watermark detecting portion 615A, the contents are duplicable and so they are outputted as the MPEG stream without having the watermark re-marked by the addition portion 606A.

In the case where the watermark indicating the prohibition of the duplication is detected by the watermark detecting portion 615A, the control portion 614 exerts control to prohibit the recording.

Here, in the electronic watermark embedding apparatus 601B shown in FIG. 16, the watermark detecting portion 615 and the addition portion 606 are positioned more upstream than the noise reduction portion 607. To be more specific, the electronic watermark embedding apparatus 601B detects and re-marks the watermark of the video signal before the noise reduction. In addition, in the electronic watermark embedding apparatus 601C shown in FIG. 17, the watermark detecting portion 615A and the addition portion 606A are positioned more downstream than the MPEG encoder 608. To be more specific, the electronic watermark embedding apparatus 601C detects and re-marks the watermark of the MPEG stream generated by performing the noise reduction and MPEG encoding to the video signal.

Thus, the electronic watermark embedding apparatuses 601B and 601C shown in FIGS. 16 and 17 detect and re-mark the watermark at the same position in reference to the positions of the noise reduction portion 607 and the MPEG encoder 608.

However, the electronic watermark embedding apparatus according to the present invention is not limited to such configuration. For instance, in the case where the position on the upstream side of the noise reduction portion 607 is A, the position between the noise reduction portion 607 and the MPEG encoder 608 is B, and the position on the downstream side of the MPEG encoder 608 is C as shown in FIG. 10, the watermark detecting portions 615, 615A and the addition portions 606, 606A can be placed as follows.

In the case where the watermark detecting portion 615 is placed at A, it is possible to place the addition portion 606 at A or B and the addition portion 606A at C. To be more specific, it is possible to detect the watermark at A and re-mark it at A, B or C. The configuration in FIG. 7 is equivalent to the case where the watermark detecting portion 615 and the addition portion 606 are placed at A respectively. In the case where the watermark detecting portion 615 is placed at B, it is possible to place the addition portion 606 at B and the addition portion 606A at C. To be more specific, it is possible to detect the watermark at B and re-mark it at B or C. In the case where the watermark detecting portion 615A is placed at C, it is possible to place the addition portion 606A at C. To be more specific, it is possible to detect the watermark at C and re-mark it at C. The configuration in FIG. 8 is equivalent to this case.

As described above, in total, there are six configurations of the positions of the watermark detecting portions 615, 615A and the addition portions 606, 606A.

Eleventh Embodiment

Hereafter, an eleventh embodiment of the electronic watermark embedding apparatus according to the present invention will be described by referring to FIG. 18.

Figure 18:
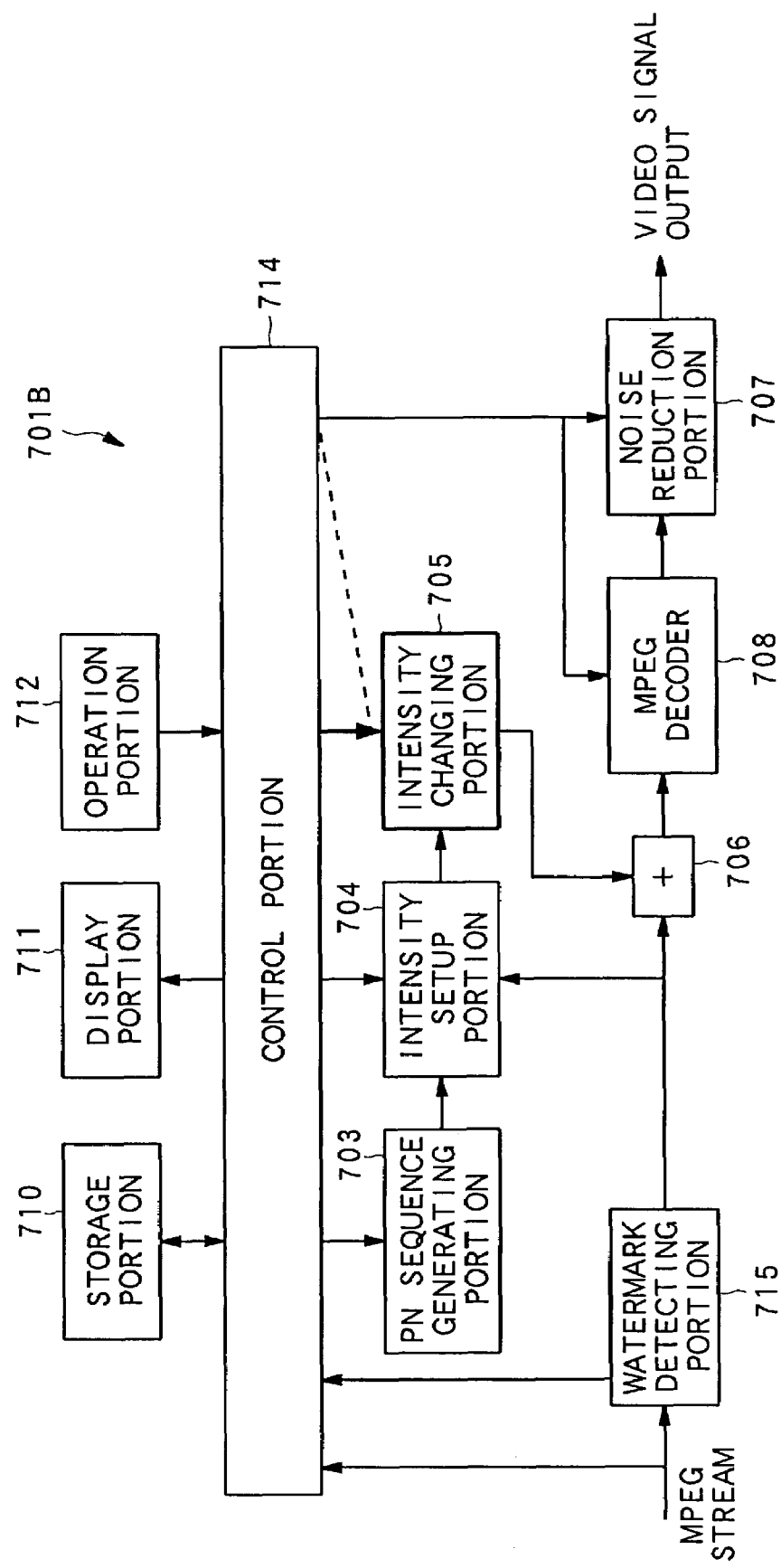
FIG. 18 is a block diagram showing the electronic watermark embedding apparatus according to an eleventh embodiment.

FIG. 18 is a block diagram showing an electronic watermark embedding apparatus 701B according to the eleventh embodiment. The electronic watermark embedding apparatus 701B re-embeds (re-marks) the watermark in the MPEG stream in which the watermark has already been embedded, and can be used as a part of the reproducing equipment for reproducing the image contents MPEG-compressed and recorded on the record medium.

As shown in FIG. 18, the electronic watermark embedding apparatus 701B has a watermark detecting portion 715 for detecting the watermark from the inputted MPEG stream, a PN sequence generating portion 703 for generating the PN sequence constituting the watermark (electronic watermark), an intensity setup portion 704 for amplifying the PN sequence outputted from the PN sequence generating portion 703 and setting up the intensity thereof, an intensity changing portion 705 for changing the intensity of the PN sequence, an addition portion 706 for adding the inputted MPEG stream to the PN sequence, an MPEG decoder 708 for decoding the MPEG stream, a noise reduction portion 707 for reducing the noise of the video signal, a storage portion 710 having the RAM and ROM, a display portion 711 for presenting the predetermined information to the operator, an operation portion 712 for receiving the operation of the operator, and a control portion 714 for controlling the above portions.

The watermark detecting portion 715 detects whether or not the watermark is embedded in the received MPEG stream and whether the watermark embedded in the MPEG stream indicates the one-generation duplication permission or the prohibition of the duplication so as to output the detection results to the control portion 714.

In the case where the watermark indicating the one-generation duplication permission is detected by the watermark detecting portion 715, the PN sequence generating portion 703 generates the PN sequence corresponding to the prohibition of the duplication. The intensity of the PN sequence is set up by the intensity setup portion 704 as with the intensity setup portion 604 of the seventh embodiment, and the intensity is further changed by the intensity changing portion 705. The PN sequence outputted from the intensity changing portion 705 is added to the MPEG stream by the addition portion 706.

The intensity changing portion 705 is controlled by the control portion 714 to change the intensity of the watermark outputted from the intensity setup portion 704 in conjunction with the intensity of the noise reduction process in the noise reduction portion 707, and it increases the intensity of the watermark as the intensity of the noise reduction process becomes higher. As shown in FIG. 18, the control portion 714 controls the noise reduction portion 707, and sends the control signal for controlling the intensity of the noise reduction process to the noise reduction portion 707. The control signal is also given to the intensity changing portion 705, and the amplification degree of the intensity changing portion 705 changes based on the control signal.

Thus, the intensity changing portion 705 is controlled by the control portion 714 to change the intensity of the PN sequence, that is, the watermark outputted from the intensity setup portion 704 in conjunction with the intensity of the noise reduction process, and it increases the intensity of the watermark as the intensity of the noise reduction process becomes higher. In this way, the electronic watermark embedding apparatus 701B can re-mark the watermark with such intensity as to counteract the influence of the noise reduction process in the noise reduction portion 707, and so the re-marked watermark is securely detected.

It generally happens that, in the case of increasing the intensity of the noise reduction process, the image quality is often degraded. Therefore, the portion in which the intensity of the noise reduction process is increased often has a degraded image from the beginning due to the processes so that, even if the intensity of the watermark is increased in such a portion, the degradation of the image quality due to the watermark is not prominent.

The period in which the intensity changing portion 705 increases the intensity of the watermark may be a short period with fixed intervals (fixed time intervals) such as the equivalent of only a few frames (1 to 3 frames) in the period of high intensity of the noise reduction process. To be more specific, the intensity changing portion 705 is controlled by the control portion 714 to intermittently increase the intensity of the watermark reflecting the intensity of the noise reduction process just by the equivalent of a few frames. The watermark of which intensity is thus increased intermittently or pulse-like is not as prominent on the image as the watermark of which intensity is increased over the period of high intensity of the noise reduction process, yet it is securely detected.

In addition, the period in which the intensity changing portion 705 increases the intensity of the watermark may be the equivalent of only a few frames at random intervals or unfixed intervals according to some rule (random or unfixed time intervals) in the period of high intensity of the noise reduction process. This is because the watermark is less prominent on the image when its intensity is increased at the random or unfixed time intervals than when increased at the fixed intervals.

Furthermore, the period in which the intensity changing portion 705 increases the intensity of the watermark may be the equivalent of only a few frames in accordance with the change in the image in the period of high intensity of the noise reduction process. For instance, it is also possible to increase the intensity of the watermark by the equivalent of a few frames in timing of significant change of the image time-wise such as changing of scenes (switching of the scenes), timing of significant change of the image in the frame such as the image having many strong edges, and timing of fierce move of the image such as a large motion vector.

In the case where the watermark indicating the one-generation duplication permission and the watermark indicating the prohibition of the duplication are not detected by the watermark detecting portion 715, the contents are duplicable and so they are outputted as the video signal without having the watermark re-marked by the addition portion 706.

In the case where the watermark indicating the prohibition of the duplication is detected by the watermark detecting portion 715, the control portion 714 exerts control to prohibit the recording.

Twelfth Embodiment

Figure 19:
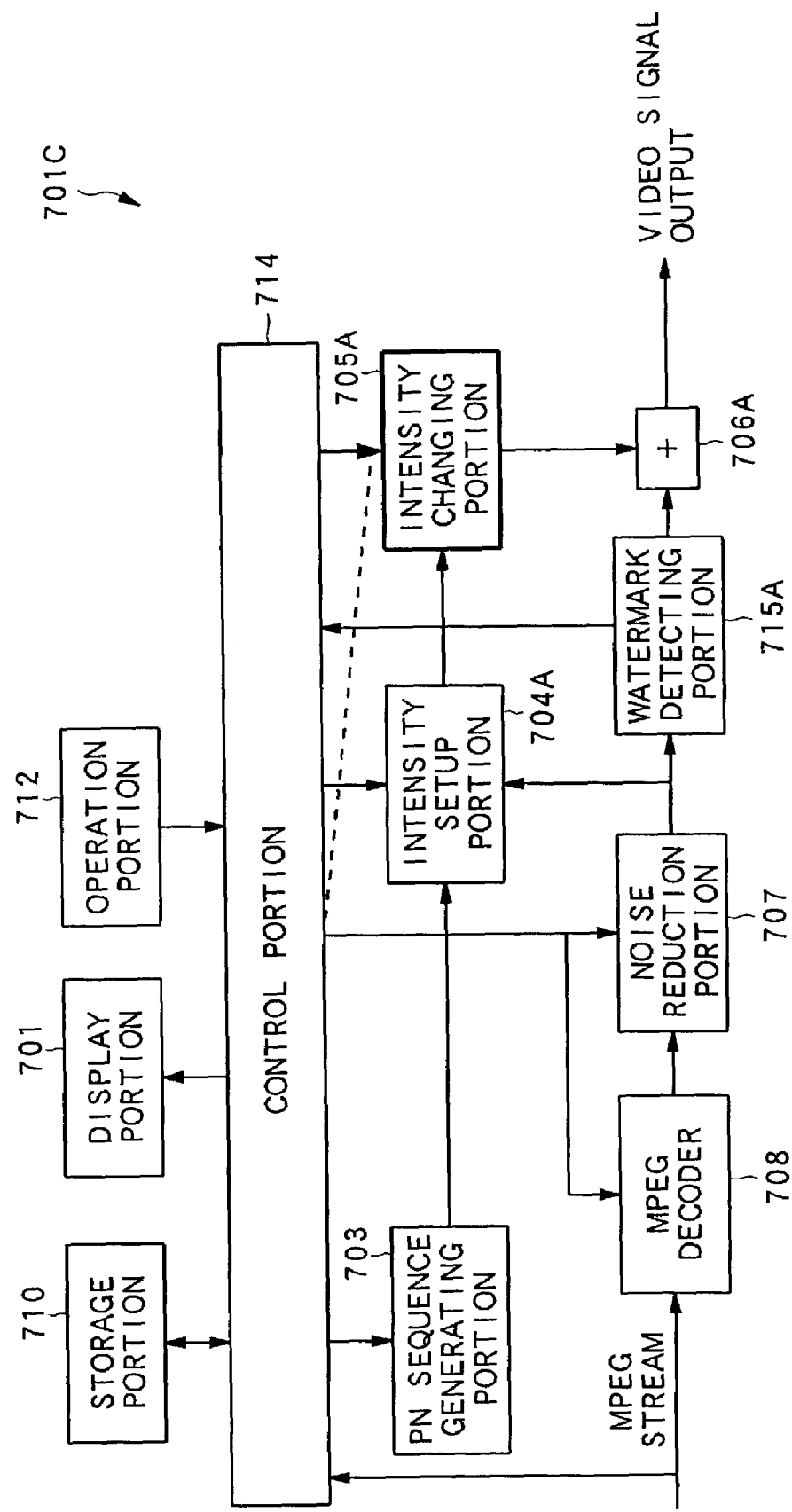
FIG. 19 is a block diagram showing an electronic watermark embedding apparatus according to a twelfth embodiment.

Hereafter, a twelfth embodiment of the electronic watermark embedding apparatus according to the present invention will be described by referring to FIG. 19. In FIG. 19, the elements corresponding to the configuration of the eleventh embodiment are given the same symbols and a description thereof will be omitted.

FIG. 19 is a block diagram showing an electronic watermark embedding apparatus 701C according to the twelfth embodiment. The electronic watermark embedding apparatus 701C re-embeds (re-marks) the watermark in the video signal in which the watermark has already been embedded, and can be used as a part of the reproducing equipment for reproducing the image contents MPEG-compressed and recorded on the record medium.

As shown in FIG. 19, the electronic watermark embedding apparatus 701C has a watermark detecting portion 715A for detecting the watermark from the video signal generated by performing MPEG decoding by the MPEG encoder 708 and the noise reduction by the noise reduction portion 707 to the inputted MPEG stream.

The watermark detecting portion 715A detects whether or not the watermark is embedded in the received video signal and whether the watermark embedded in the video signal indicates the one-generation duplication permission or the prohibition of the duplication so as to output the detection results to the control portion 714.

In the case where the watermark indicating the one-generation duplication permission is detected by the watermark detecting portion 715A, the PN sequence generating portion 703 generates the PN sequence corresponding to the prohibition of the duplication. The intensity of the PN sequence is set up by the intensity setup portion 704A as with the intensity setup portion 604 of the seventh embodiment, and the intensity is further changed by the intensity changing portion 705A. The PN sequence outputted from the intensity changing portion 705A is added to the video signal by the addition portion 706A.

The intensity changing portion 705A is controlled by the control portion 714 to change the intensity of the watermark outputted from the intensity setup portion 704A in conjunction with the intensity of the noise reduction process in the noise reduction portion 707, and it increases the intensity of the watermark as the intensity of the noise reduction process becomes higher. As shown in FIG. 18, the control portion 714 controls the noise reduction portion 707, and sends the control signal for controlling the intensity of the noise reduction process to the noise reduction portion 707. The control signal is also given to the intensity changing portion 705A, and the amplification degree of the intensity changing portion 705A changes based on the control signal.

Thus, the intensity changing portion 705A is controlled by the control portion 714 to change the intensity of the PN sequence, that is, the watermark outputted from the intensity setup portion 704 in conjunction with the intensity of the noise reduction process, and it increases the intensity of the watermark as the intensity of the noise reduction process becomes higher.

As described above, the electronic watermark embedding apparatus 701C has the decoding by the MPEG encoder 708 and the noise reduction process by the noise reduction portion 707 performed to the MPEG stream so as to superimpose the PN sequence, that is, the watermark on a generated video signal. Normally, in the case where the intensity of the noise reduction process by the noise reduction portion 707 is high, the image having undergone the noise reduction process is apt to be flat. For this reason, in the case where the state of high intensity of the noise reduction process continues, there is a possibility that the intensity of the watermark set up by the intensity setup portion 704A will be kept low for a long time. However, as described above, the intensity changing portion 705A changes the intensity of the watermark according to the intensity of the noise reduction process by the noise reduction portion 707. Therefore, even if the state of high intensity of the noise reduction process continues, the intensity of the watermark will not be kept low. Therefore, the watermark is securely detected when the image contents having the watermark embedded therein are reproduced.

The electronic watermark embedding apparatus 701C re-marks the watermark after the decoding process and the noise reduction process which consequently degrade the watermark, so that there is no possibility of degrading the watermark by the decoding process and the noise reduction process. Therefore, the electronic watermark embedding apparatus 701C has an advantage that it can more appropriately manage the intensity and state of the watermark embedded in the video signal.

In the case where the watermark indicating the one-generation duplication permission and the watermark indicating the prohibition of the duplication are not detected by the watermark detecting portion 715A, the contents are duplicable and so they are outputted as the video signal without having the watermark re-marked by the addition portion 706A.

In the case where the watermark indicating the prohibition of the duplication is detected by the watermark detecting portion 715A, the control portion 714 exerts control to prohibit the recording.

Here, in the electronic watermark embedding apparatus 701B shown in FIG. 18, the watermark detecting portion 715 and the addition portion 706 are positioned more upstream than the MPEG decoder 708. To be more specific, the electronic watermark embedding apparatus 701B detects and re-marks the watermark of the MPEG stream before being MPEG-decoded. In addition, in the electronic watermark embedding apparatus 701C shown in FIG. 19, the watermark detecting portion 715A and the addition portion 706A are positioned more downstream than the noise reduction portion 707. To be more specific, the electronic watermark embedding apparatus 701C detects and re-marks the watermark of the video signal generated by performing the MPEG decoding and noise reduction to the MPEG stream.

Thus, the electronic watermark embedding apparatuses 701B and 701C shown in FIGS. 18 and 19 detect and re-mark the watermark at the same position in reference to the positions of the noise reduction portion 707 and the MPEG decoder 708.

However, the electronic watermark embedding apparatus according to the present invention is not limited to such configuration. For instance, in the case where the position on the upstream side of the MPEG decoder 708 is D, the position between the MPEG decoder 708 and the noise reduction portion 707 is E, and the position on the downstream side of the noise reduction portion 707 is F as shown in FIG. 13, the watermark detecting portions 715, 715A and the addition portions 706, 706A can be placed as follows.

In the case where the watermark detecting portion 715 is placed at D, it is possible to place the addition portion 706A at E or F and the addition portion 706A at D. To be more specific, it is possible to detect the watermark at D and re-mark it at D, E or F. The configuration in FIG. 10 is equivalent to the case where the watermark detecting portion 715 and the addition portion 706 are placed at D respectively. In the case where the watermark detecting portion 715 is placed at E, it is possible to place the addition portion 706A at E or F. To be more specific, it is possible to detect the watermark at E and re-mark it at E or F. In the case where the watermark detecting portion 715A is placed at F, it is possible to place the addition portion 706A at F. To be more specific, it is possible to detect the watermark at F and re-mark it at F. The configuration in FIG. 19 is equivalent to this case.

As described above, in total, there are six configurations of the positions of the watermark detecting portions 715, 715A and the addition portions 706, 706A.

Thirteenth Embodiment

Hereafter, a thirteenth embodiment of the electronic watermark embedding apparatus according to the present invention will be described by referring to FIGS. 2 to 5 and 20.

Figure 20:
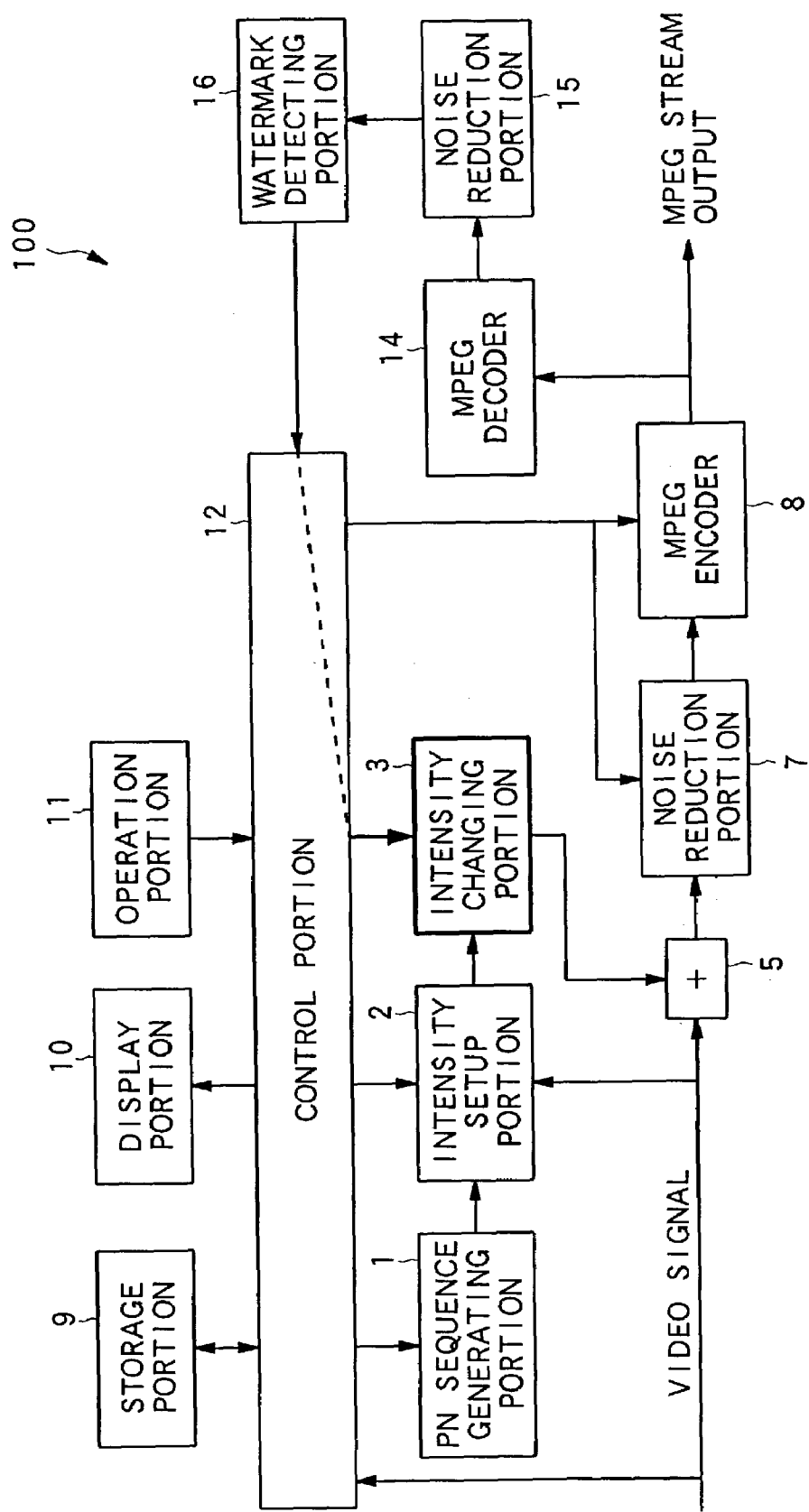
FIG. 20 is a block diagram showing the electronic watermark embedding apparatus according to a thirteenth embodiment.

FIG. 20 is a block diagram showing an electronic watermark embedding apparatus 100 according to the thirteenth embodiment. The electronic watermark embedding apparatus 100 embeds a watermark (electronic watermark) in a video signal which is a base band.

As shown in FIG. 20, the electronic watermark embedding apparatus 100 has a PN sequence generating portion 1 for generating a PN (Pseudorandom Noise) sequence constituting the watermark (electronic watermark) used as information on limitation of duplication of the image contents, an intensity setup portion 2 for amplifying the PN sequence outputted from the PN sequence generating portion 1 and setting up the intensity thereof, an intensity changing portion 3 for changing the intensity of the PN sequence, an addition portion 5 for adding the video signal to the PN sequence, a noise reduction portion 7 for reducing the noise of the video signal, an MPEG encoder 8 for compression-encoding the data of the image contents, a storage portion 9 having an RAM and an ROM, a display portion 10 for presenting predetermined information to an operator, an operation portion 11 for receiving an operation of the operator, and a control portion 12 for controlling the above portions.

The electronic watermark embedding apparatus 100 has an MPEG decoder 14 for decoding an MPEG stream outputted from the MPEG encoder 8, a noise reduction portion 15 for performing a noise reduction process to the video signal outputted from the MPEG decoder 14, and a watermark detecting portion 16 for detecting the watermark based on the video signal outputted from the noise reduction portion 15. The detection results of the watermark of the watermark detecting portion 16 are sent to the control portion 12.

The electronic watermark embedding apparatus 100 can be used as a part of broadcasting equipment of a broadcast station for instance. In this case, it is possible to distribute the image by amplifying an MPEG stream outputted from the MPEG encoder 8 with a video signal outputting apparatus and sending it via an antenna.

The electronic watermark embedding apparatus 100 can be used as a part of a recording apparatus used by a motion picture company for instance. In this case, it is possible to embed the watermark into the contents having no watermark so as to record the contents on a record medium such as an optical disk or a video tape.

Next, a description will be given by referring to FIGS. 2 to 5 as to the watermark comprised of the PN sequence generated by the PN sequence generating portion 1.

A digital image includes the information representing luminance of each image constituting the digital image. The information representing the luminance is a numerical value of 4 to 8 bits or so for instance, and is corresponding to a pixel constituting the image respectively. To be more specific, the numerical value representing the luminance is individually set up for each pixel (hereafter, the numerical value representing the luminance of the pixel is referred to as a "luminance value"). To describe it concretely by using FIG. 2, an image P1 in FIG. 2 is one of the images constituting the digital image, and a, b, c, d . . . in the image P1 indicate the luminance values set up for the respective pixels.

The watermark is comprised of a signal generated based on a predetermined rule, that is, the PN sequence in this embodiment for instance, and is embedded into the image by adding the symbols of the PN sequence to the luminance values of the pixels respectively. For instance, "0011 . . . " in FIG. 2 is the PN sequence constituting the watermark. If this PN sequence is added to the luminance values a, b, c, d . . . in the image P1, the luminance values become a, b, c+1, d+1 . . . as shown in FIG. 3. Thus, the watermark is embedded in each image constituting the digital image.

The PN sequence constituting the watermark is a sequence of pseudorandom signals such as an M sequence for instance, and is generated by giving an initial value to a polynomial (generating equation) for generating the PN sequence. In this embodiment, the polynomial (generating equation) for generating the PN sequence is embodied as a PN sequence generating circuit 101 shown in FIG. 4 for instance. The PN sequence generating circuit 101 is comprised of shift registers 1A to 1D and an adder 1E, and is provided to the PN sequence generating portion 101. As for the PN sequence which are actually used, those having a larger number of the shift registers are used so that a sequence period will be longer.

According to this embodiment, two types of mutually different PN sequences are generated, where one of them is used as the watermark for indicating the permission of one-generation duplication and the other is used as the watermark for indicating the prohibition of the duplication. The PN sequence has an arrangement of random symbols changed by changing one or both of the polynomial and initial value. Therefore, it is possible to generate a different PN sequence by changing one or both of the polynomial and initial value.

For instance, the PN sequence to be used as the watermark for indicating the permission of the one-generation duplication is generated by the PN sequence generating circuit 101 shown in FIG. 4. On the other hand, the PN sequence to be used as the watermark for indicating the prohibition of the duplication is generated by a PN sequence generating circuit 102 shown in FIG. 5. The PN sequence generating circuit 102 shown in FIG. 5 embodies the polynomial (generating equation) different from the polynomial (generating equation) corresponding to the PN sequence generating circuit 101, and is comprised of shift registers 2A to 2D and an adder 2E. The PN sequence generating circuit 102 is also provided to the PN sequence generating portion 101.

It is apparent that the polynomial corresponding to the PN sequence generating circuit 101 is different from the polynomial corresponding to the PN sequence generating circuit 102 because the connections of the shift registers and the adder are different between the PN sequence generating circuit 101 and the PN sequence generating circuit 102. Thus, it is possible to generate the watermark for indicating the permission of the one-generation duplication and the watermark for indicating the prohibition of the duplication by using the two PN sequence generating circuits different in the connection or constitution (that is, two polynomials of different structures) respectively.

It is also possible, by using only the PN sequence generating circuit 101 shown in FIG. 4, to generate the watermark for indicating the permission of the one-generation duplication and the watermark for indicating the prohibition of the duplication respectively. In this case, two kinds of the initial values to be given to the PN sequence generating circuit 101 are prepared. One of the two kinds of the initial values is given to the PN sequence generating circuit 101 so as to generate the PN sequence constituting the watermark for indicating the permission of the one-generation duplication, and the other initial value is given to the same PN sequence generating circuit 101 so as to generate the PN sequence constituting the watermark for indicating the prohibition of the duplication. For instance, when generating the PN sequence constituting the watermark for indicating the permission of the one-generation duplication, an initial value "0011" is inputted to the shift registers 1A to 1D. On the other hand, when generating the PN sequence constituting the watermark for indicating the prohibition of the duplication, an initial value "0101" is inputted to the shift registers 1A to 1D.

Next, the operation of the intensity setup portion 2 will be described.

As shown in FIG. 20, the intensity setup portion 2 has the video signal and the PN sequence outputted from the PN sequence generating portion 101 inputted thereto. And the intensity setup portion 2 sets the PN sequence from the PN sequence generating portion 101 at appropriate intensity based on the inputted video signal. To be more specific, the intensity setup portion 2 detects whether the luminance values set respectively to the pixels constituting one image have changed greatly or slightly. If the luminance values have changed greatly, the image has a complicated pattern for instance, so that the watermark does not become prominent even if embedded therein. Thus, if the luminance values have changed greatly, the intensity setup portion 2 sets the PN sequence, that is, the watermark outputted from the PN sequence generating portion 101 at a rather high intensity. For instance, in the case where the PN sequence is "0101...," the intensity setup portion 2 sets it at "0202" or "0303." And the intensity setup portion 2 outputs the PN sequence which is set to the intensity changing portion 3.

If the luminance values set to the pixels constituting one image respectively have changed slightly, the image is a flat image for instance, so that the watermark is apt to be prominent. Thus, if the luminance values have changed slightly, the intensity setup portion 2 outputs the PN sequence outputted from the PN sequence generating portion 101 as-is to the intensity changing portion 3.

Next, the operation of the intensity changing portion 3 will be described.

The intensity changing portion 3 is controlled by the control portion 12 to change the intensity of the PN sequence outputted from the intensity setup portion 2 according to the detection results of the watermark of the watermark detecting portion 16. To be more specific, on receiving the detection results of the watermark from the watermark detecting portion 16, the control portion 12 controls a degree of amplification of the intensity changing portion 3 according to the detection results.

For instance, in the case where the detection results of the watermark shows that the intensity of the watermark detected by the watermark detecting portion 16 is smaller than a fixed value or is undetectable, the control portion 12 exerts control to increase the degree of amplification of the intensity changing portion 3 so as to increase the intensity of the PN sequence. In the case where the detection results of the watermark shows that the intensity of the watermark detected by the watermark detecting portion 16 is larger than the fixed value, the control portion 12 exerts control to decrease the degree of amplification of the intensity changing portion 3 so as to decrease the intensity of the PN sequence. It is possible, by means of such control, to control the intensity of the PN sequence added to the video signal by the addition portion 5 so that the intensity of the watermark detected by the watermark detecting portion 16 will be in a fixed range.

The control portion 12 may either exert control to vary the degree of amplification of the intensity changing portion 3 in stages or exert control to vary it continuously.

The control portion 12 may also control the intensity changing portion 3 so as to increase the intensity of the watermark for a short period of time at fixed intervals (fixed time intervals), that is, by an equivalent of only a few frames (1 to 3 frames) for instance. To be more specific, the intensity changing portion 3 is controlled by the control portion 12 to intermittently increase the intensity of the watermark by an equivalent of a few frames. In addition, the control portion 12 controls the intensity changing portion 3 so as to have the detection results of the watermark detecting portion 16 reflected on the intensity of the watermark in this short period of time.

Thus, the watermark of which intensity is thus increased intermittently or pulse-like is not as prominent on the image as the watermark of which intensity is constantly controlled based on the detection results of the watermark, yet it is securely detected.

The period in which the intensity changing portion 3 increases the intensity of the watermark may be an equivalent of a few frames at random intervals or unfixed intervals according to some rule (random or unfixed time intervals). This is because the watermark is less prominent on the image when its intensity is increased at the random or unfixed time intervals than when increased at the fixed intervals.

Furthermore, the period in which the intensity changing portion 3 increases the intensity of the watermark may be an equivalent of only a few frames in accordance with the change in the image. For instance, it is also possible to increase the intensity of the watermark by an equivalent of only a few frames in timing of significant change of the image time-wise such as change of scenes (switching of the scenes), timing of significant change of the image in the frame such as the image having many strong edges, and timing of fierce move of the image such as a large motion vector. To be more specific, the control portion 12 exerts control to have the intensity of the PN sequence increased by the intensity changing portion 3 at the random or unfixed intervals according to some rule, for each change of scenes, for each image having many edges (complicated image, active image), and for each image of fierce move (such as the image having the large motion vector).

Also, the reason why the intensity changing portion 3 increases the intensity of the watermark for each change of scenes, each image having many edges and each image of fierce move is that the watermark becomes less recognizable for the viewer by means of the image often changing timewise due to switching of the scenes, the image having many edges and the image of fierce move even if the intensity of the watermark is high.

And the addition portion 5 adds the video signal to the PN sequence outputted from the intensity changing portion 3, and outputs it to the noise reduction portion 7. The noise reduction portion 7 performs the noise reduction process to the video signal having the PN sequence added thereto, and outputs it to the MPEG encoder 8. The MPEG encoder 8 compression-encodes the video signal having undergone the noise reduction process, and outputs it as the MPEG stream.

As shown in FIG. 20, the electronic watermark embedding apparatus 100 has a decoding process performed by the MPEG decoder 14 to the MPEG stream outputted from the MPEG encoder 8, and further has the noise reduction process performed by the noise reduction portion 15 to the video signal outputted from the MPEG decoder 14. And the watermark detecting portion 16 detects the watermark based on the video signal outputted from the noise reduction portion 15.

Thus, the electronic watermark embedding apparatus 100 detects the watermark based on the signal having gone through the decoding process by the MPEG decoder 14 and the noise reduction process by the noise reduction portion 15. Such processes by the MPEG decoder 14 and noise reduction portion 15 are corresponding to the processes of reproducing the contents based on the MPEG stream outputted from the electronic watermark embedding apparatus 100 and so on, and the position of the watermark detecting portion 16 is corresponding to the position at which the watermark is detected when reproducing the contents. To be more specific, in the case of performing the noise reduction process to the video signal generated by decoding the MPEG stream, degradation of the watermark arises in the decoding process and the noise reduction process. The electronic watermark embedding apparatus 100 has the processes performed by the MPEG decoder 14 and noise reduction portion 15, and it can thereby generate the signal to which the degradation of the watermark assumed on reproduction based on the MPEG stream and so on is added. And it has a configuration wherein the watermark detecting portion 16 detects the watermark based on the signal generated through these processes, and it can thereby obtain a detection state approximate to the detection state of the watermark on actual reproduction. Therefore, it is possible to precisely conform the detection results of the watermark of the watermark detecting portion 16 to the detection results of the watermark on the reproduction and so on so as to precisely control the intensity of the watermark.

The electronic watermark embedding apparatus 100 detects the watermark based on the signal having gone through the decoding process by the MPEG decoder 14 and the noise reduction process by the noise reduction portion 15. It is also possible, however, for the watermark detecting portion 16 to directly detect the watermark based on the MPEG stream outputted from the MPEG encoder 8.

The control portion 12 may also control the intensity changing portion 3 to consecutively perform detecting operations in the watermark detecting portion 16 so that the detection results can be reflected on the intensity of the watermark in real time. Or the control portion 12 may also control the watermark detecting portion 16 or the intensity changing portion 3 by performing detecting operations in the watermark detecting portion 16 or control of the degree of amplification of the intensity changing portion 3 intermittently, for example, each time the fixed time elapses, so as to change the intensity of the watermark at intervals.

FIG. 20 shows an example wherein the watermark is detected in the watermark detecting portion 16 based on the signal having gone through the MPEG decoder 14 and the noise reduction portion 15. It is possible, however, to adopt various configurations for degrading the watermark. For instance, it is also possible to provide a circuit equivalent to a signal processing circuit of a VCR provided at the front of the portion for detecting the watermark instead of the MPEG decoder 14 and the noise reduction portion 15. In this case, it is feasible to reproduce the degradation of the watermark assuming the case of recording the image with the VCR based on the MPEG stream outputted from the MPEG encoder 8. For this reason, the intensity of the watermark can be controlled to suit the case of recording the image with the VCR.

As described above, the electronic watermark embedding apparatus 100 according to the thirteenth embodiment changes the intensity of the watermark according to the detection results of actually detecting the embedded watermark, and so it can control the intensity of the watermark not to be excessively large but to be a sufficient value to be securely detected.

Fourteenth Embodiment

Figure 21:
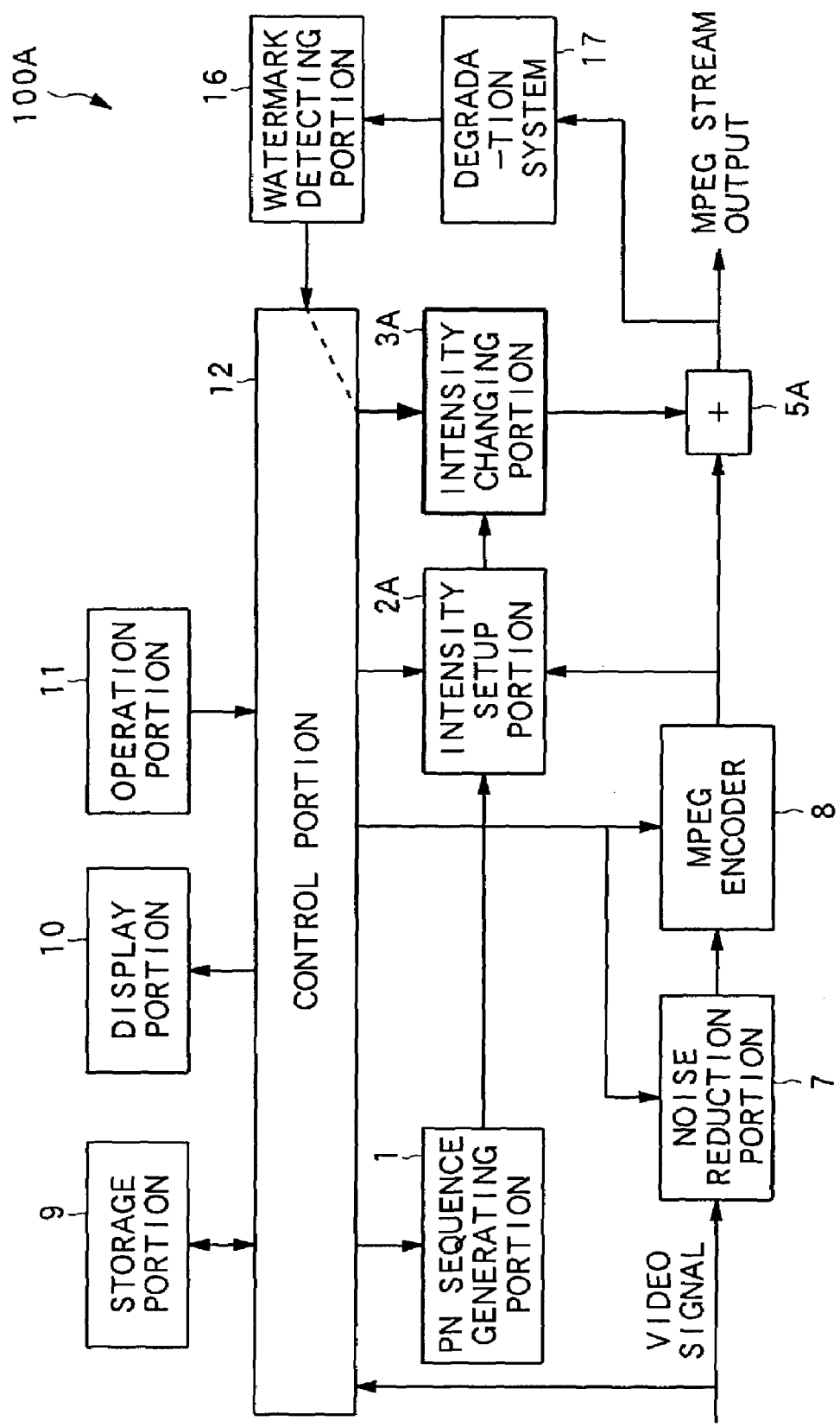
FIG. 21 is a block diagram showing the electronic watermark embedding apparatus according to a fourteenth embodiment.

Hereafter, a second embodiment of the electronic watermark embedding apparatus according to the present invention will be described by referring to FIG. 21. In FIG. 21, the elements corresponding to the configuration of the thirteenth embodiment are given the same symbols and a description thereof will be omitted.

FIG. 21 is a block diagram showing an electronic watermark embedding apparatus 100A according to the second embodiment. The electronic watermark embedding apparatus 100A embeds the watermark in the MPEG stream having MPEG-encoded the image contents, and can be used, for instance, as a part of a recorder for recording the video signal sent from a broadcast station on the record medium.

As shown in FIG. 21, the electronic watermark embedding apparatus 100A has a PN sequence generating portion 1 for generating a PN (Pseudorandom Noise) sequence constituting the watermark (electronic watermark) used as information on limitation of duplication of the image contents, an intensity setup portion 2 for amplifying the PN sequence outputted from the PN sequence generating portion 1 and setting up the intensity thereof, an intensity changing portion 3 for changing the intensity of the PN sequence, an addition portion 5 for adding the video signal to the PN sequence, a noise reduction portion 7 for reducing the noise of the video signal, an MPEG encoder 8 for compression-encoding the data of the image contents, an addition portion 5A for adding the PN sequence to the MPEG stream out of the MPEG encoder 8, a storage portion 9 having an RAM and an ROM, a display portion 10 for presenting predetermined information to an operator, an operation portion 11 for receiving an operation of the operator, and a control portion 12 for controlling the above portions.

The electronic watermark embedding apparatus 100A has a degradation system 17 for receiving the MPEG stream to which the PN sequence is added outputted from the addition portion 5A and the watermark detecting portion 16 for receiving an output signal of the degradation system 17. The watermark is detected by the watermark detecting portion 16, and the detection results of the watermark are sent to the control portion 12.

The degradation system 17 is the portion equivalent to the MPEG decoder 14 and the noise reduction portion 15 of the electronic watermark embedding apparatus 100. As for the configuration of the degradation system 17, various configurations can be adopted as with the thirteenth embodiment. It is also possible, by omitting the degradation system 17, for the watermark detecting portion 16 to directly detect the watermark based on the MPEG stream outputted from the addition portion 5A.

As shown in FIG. 21, the electronic watermark embedding apparatus 100A according to the second embodiment has the noise reduction process performed to the video signal by the noise reduction portion 7 and a compression encoding process further performed thereto by the MPEG encoder 8 so as to input the MPEG stream to an intensity setup portion 2A and the addition portion 5A. Therefore, the intensity setup portion 2A sets up the intensity of the PN sequence based on the MPEG stream. The addition portion 5A adds the PN sequence to the MPEG stream.

An intensity changing portion 3A is controlled by the control portion 12 to change the intensity of the PN sequence outputted from the intensity setup portion 2A according to the detection results of the watermark of the watermark detecting portion 16A. To be more specific, on receiving the detection results of the watermark from the watermark detecting portion 16A, the control portion 12 controls the degree of amplification of the intensity changing portion 3A according to the detection results. As for the operation of the intensity changing portion 3A, the same operation as that of the intensity changing portion 3 according to the thirteenth embodiment may be adopted.

As described above, the electronic watermark embedding apparatus 100A according to the second embodiment changes the intensity of the watermark according to the detection results of actually detecting the embedded watermark, and so it can control the intensity of the watermark so as to be securely detected without unnecessarily increasing it.

Fifteenth Embodiment

Figure 22:
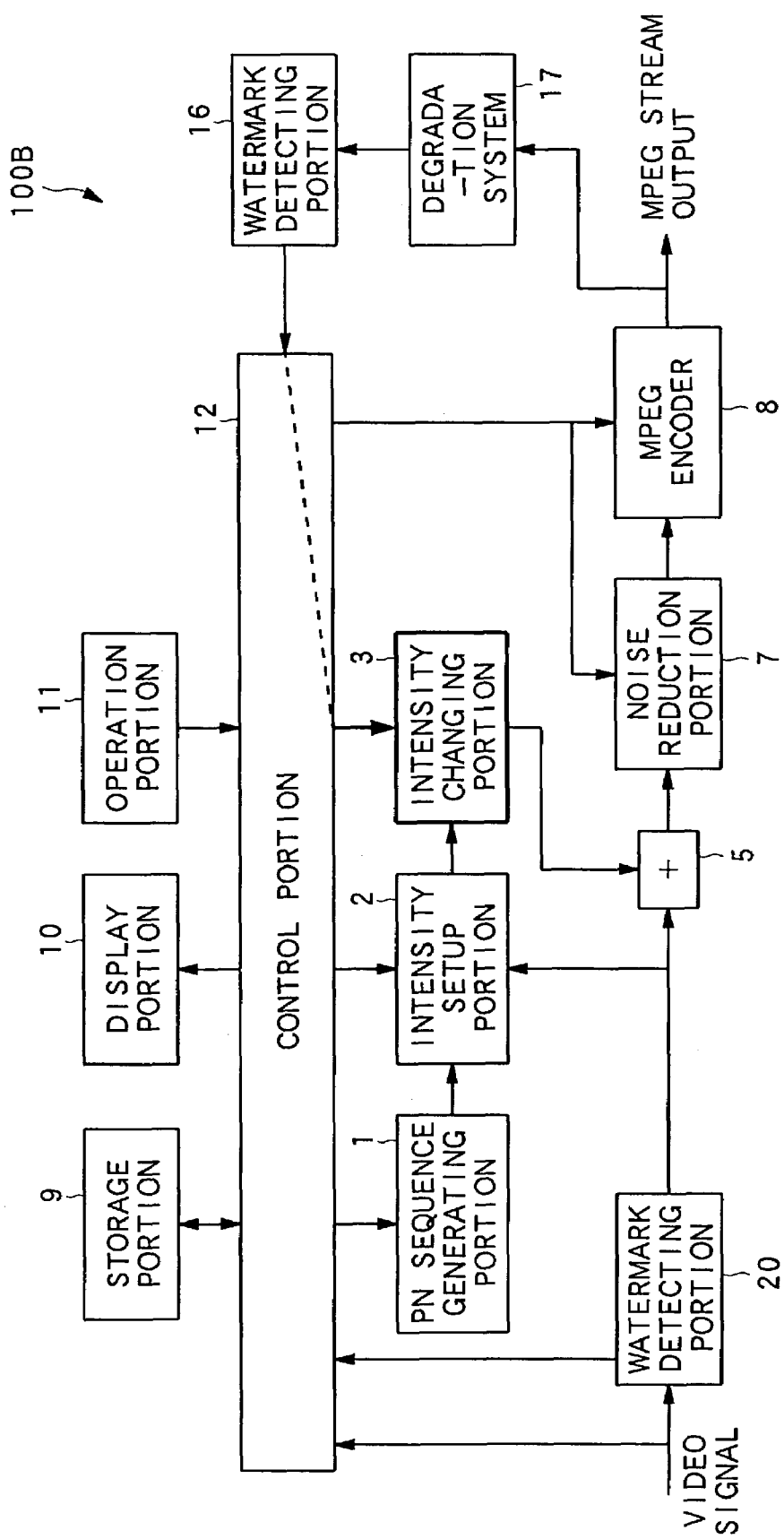
FIG. 22 is a block diagram showing the electronic watermark embedding apparatus according to a fifteenth embodiment.

Hereafter, a fifteenth embodiment of the electronic watermark embedding apparatus according to the present invention will be described by referring to FIG. 22. In FIG. 22, the elements corresponding to the configuration of the thirteenth embodiment are given the same symbols and a description thereof will be omitted.

FIG. 22 is a block diagram showing an electronic watermark embedding apparatus 100B according to the fifteenth embodiment. The electronic watermark embedding apparatus 100B re-embeds (re-marks) the watermark in the video signal referred to as the base band in which the watermark has already been embedded, and can be used as a part of the broadcasting equipment of the broadcast station or as a part of the recording equipment of the motion picture company as with the electronic watermark embedding apparatus 100.

As shown in FIG. 22, the electronic watermark embedding apparatus 100B has a PN sequence generating portion 1 for generating a PN (Pseudorandom Noise) sequence constituting the watermark (electronic watermark) used as information on limitation of duplication of the image contents, an intensity setup portion 2 for amplifying the PN sequence outputted from the PN sequence generating portion 1 and setting up the intensity thereof, an intensity changing portion 3 for changing the intensity of the PN sequence, an addition portion 5 for adding the video signal to the PN sequence, a noise reduction portion 7 for reducing the noise of the video signal, an MPEG encoder 8 for compression-encoding the data of the image contents, a storage portion 9 having an RAM and an ROM, a display portion 10 for presenting predetermined information to an operator, an operation portion 11 for receiving an operation of the operator, and a control portion 12 for controlling the above portions.

As shown in FIG. 22, the electronic watermark embedding apparatus 100B has a watermark detecting portion 20 for detecting the watermark from an inputted video signal.

The electronic watermark embedding apparatus 100B has a degradation system 17 for receiving the MPEG stream to which the PN sequence is added outputted from the MPEG encoder 8 and the watermark detecting portion 16 for receiving an output signal of the degradation system 17. The watermark is detected by the watermark detecting portion 16, and the detection results of the watermark are sent to the control portion 12.

The degradation system 17 is the portion equivalent to the MPEG decoder 14 and the noise reduction portion 15 of the electronic watermark embedding apparatus 100. As for the configuration of the degradation system 17, various configurations can be adopted as with the thirteenth embodiment. It is also possible, by omitting the degradation system 17, for the watermark detecting portion 16 to directly detect the watermark based on the MPEG stream outputted from the MPEG encoder 8.

Before recording a received video signal on the record medium such as the optical disk, the watermark detecting portion 20 detects whether or not the watermark is embedded in the video signal and which of the one-generation duplication permission and the prohibition of the duplication is indicated by the watermark embedded in the video signal so as to output the detection results to the control portion 12.

In the case where the watermark indicating the one-generation duplication permission is detected by the watermark detecting portion 20, a PN sequence generating portion 1 generates the PN sequence corresponding to the prohibition of the duplication. The intensity of the PN sequence is set up by the intensity setup portion 2 as with the thirteenth embodiment, and the intensity is further changed by the intensity changing portion 3. The PN sequence outputted from the intensity changing portion 3 is added to the video signal by the addition portion 5.

An intensity changing portion 3 is controlled by the control portion 12 to change the intensity of the PN sequence outputted from the intensity setup portion 2 according to the detection results of the watermark of the watermark detecting portion 16. To be more specific, on receiving the detection results of the watermark from the watermark detecting portion 16, the control portion 12 controls the degree of amplification of the intensity changing portion 3 according to the detection results. As for the operation of the intensity changing portion 3, the same operation as that of the intensity changing portion 3 according to the thirteenth embodiment may be adopted.

Thus, in the case of detecting that the watermark indicating the one-generation duplication permission is embedded, the electronic watermark embedding apparatus 100B re-marks the watermark indicating the prohibition of the duplication in the image contents. At this time, it changes the intensity of the watermark according to the detection results of actually detecting the embedded watermark, and so it can control the intensity of the watermark so as to be securely detected without unnecessarily increasing it.

In the case where the watermark indicating the one-generation duplication permission and the watermark indicating the prohibition of the duplication are not detected by the watermark detecting portion 20, the contents are duplicable and so they are outputted as the MPEG stream without having the watermark re-marked by the addition portion 5.

In the case where the watermark indicating the prohibition of the duplication is detected by the watermark detecting portion 20, the control portion 12 exerts control to prohibit the recording.

Sixteenth Embodiment

Figure 23:
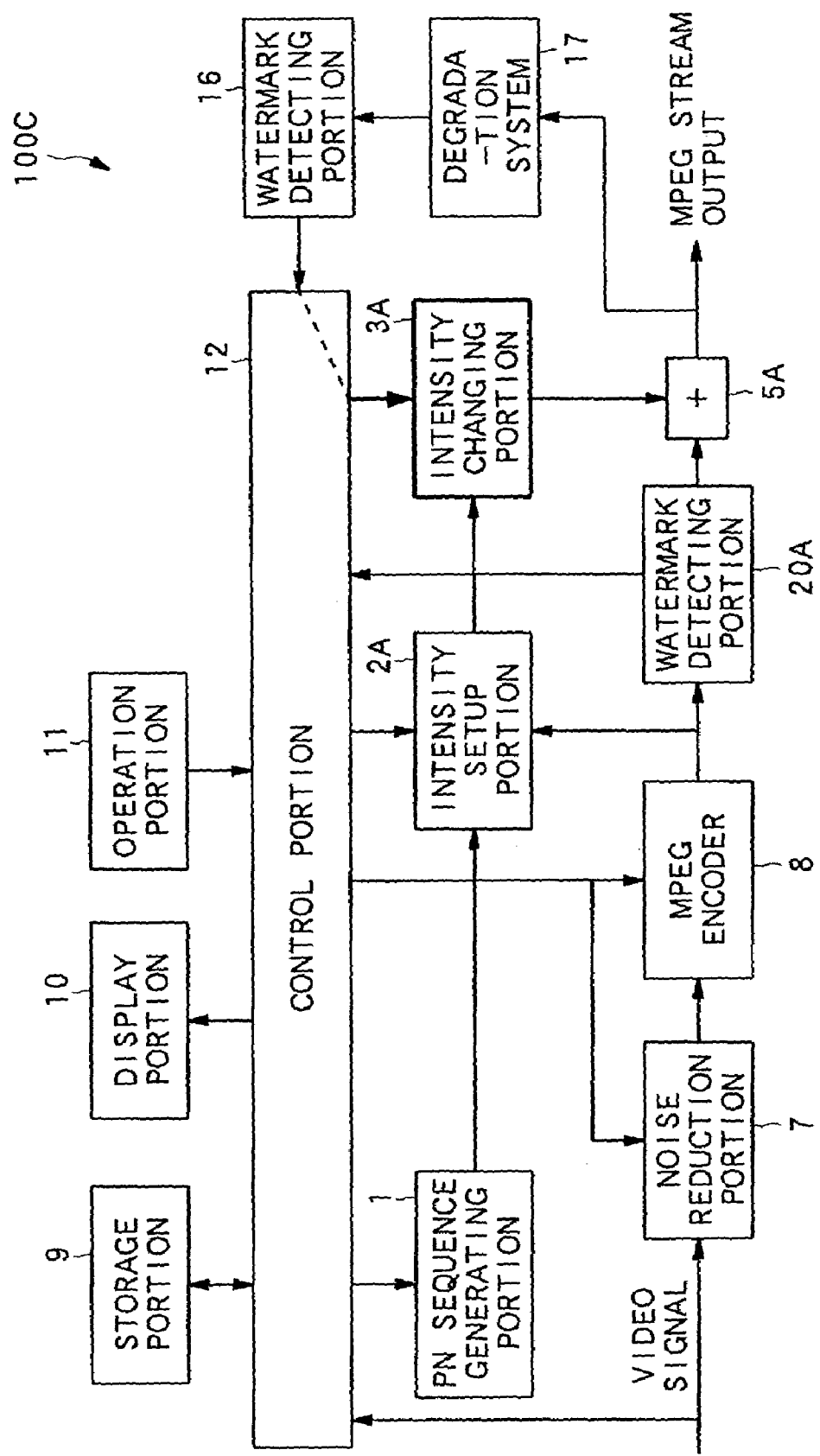
FIG. 23 is a block diagram showing the electronic watermark embedding apparatus according to a sixteenth embodiment.

Hereafter, a Sixteenth embodiment of the electronic watermark embedding apparatus according to the present invention will be described by referring to FIG. 23. In FIG. 23, the elements corresponding to the configuration of the thirteenth embodiment are given the same symbols and a description thereof will be omitted.

FIG. 23 is a block diagram showing an electronic watermark embedding apparatus 100C according to the fourth embodiment. The electronic watermark embedding apparatus 100C re-embeds (re-marks) the watermark in the MPEG stream referred to as the base band in which the watermark has already been embedded, and can be used, for instance, as a part of a recorder for recording the video signal sent from a broadcast station on the record medium as with the electronic watermark embedding apparatus 100A.

As shown in FIG. 23, the electronic watermark embedding apparatus 100C has a PN sequence generating portion 1 for generating a PN (Pseudorandom Noise) sequence constituting the watermark (electronic watermark) used as information on limitation of duplication of the image contents, an intensity setup portion 2A for amplifying the PN sequence outputted from the PN sequence generating portion 1 and setting up the intensity thereof, an intensity changing portion 3A for changing the intensity of the PN sequence, an addition portion 5A for adding the video signal to the PN sequence, a noise reduction portion 7 for reducing the noise of the video signal, an MPEG encoder 8 for compression-encoding the data of the image contents, a storage portion 9 having an RAM and an ROM, a display portion 10 for presenting predetermined information to an operator, an operation portion 11 for receiving an operation of the operator, and a control portion 12 for controlling the above portions.

The electronic watermark embedding apparatus 100C has a degradation system 17 for receiving the MPEG stream to which the PN sequence is added outputted from the addition portion 5A and the watermark detecting portion 16 for receiving an output signal of the degradation system 17. The watermark is detected by the watermark detecting portion 16, and the detection results of the watermark are sent to the control portion 12.

The degradation system 17 is the portion equivalent to the MPEG decoder 14 and the noise reduction portion 15 of the electronic watermark embedding apparatus 100. As for the configuration of the degradation system 17, various configurations can be adopted as with the thirteenth embodiment. It is also possible, by omitting the degradation system 17, for the watermark detecting portion 16 to directly detect the watermark based on the MPEG stream outputted from the MPEG encoder 8.

Furthermore, as shown in FIG. 23, the electronic watermark embedding apparatus 100C has the watermark detecting portion 20A for detecting the watermark from the MPEG stream generated by having the noise reduction process performed to the inputted video signal by the noise reduction portion 7 and the compression encoding process performed thereto by the MPEG encoder 8.

Before recording a received MPEG stream on the record medium such as the optical disk, the watermark detecting portion 20A detects whether or not the watermark is embedded in the MPEG stream and which of the one-generation duplication permission and the prohibition of the duplication is indicated by the watermark embedded in the MPEG stream so as to output the detection results to the control portion 12.

In the case where the watermark indicating the one-generation duplication permission is detected by the watermark detecting portion 20A, a PN sequence generating portion 1 generates the PN sequence corresponding to the prohibition of the duplication. The intensity of the PN sequence is set up by the intensity setup portion 2A as with the intensity setup portion 2 of the thirteenth embodiment, and the intensity is further changed by the intensity changing portion 3A. The PN sequence outputted from the intensity changing portion 3A is added to the MPEG stream by the addition portion 5A.

An intensity changing portion 3A is controlled by the control portion 12 to change the intensity of the PN sequence outputted from the intensity setup portion 2A according to the detection results of the watermark of the watermark detecting portion 16. To be more specific, on receiving the detection results of the watermark from the watermark detecting portion 16, the control portion 12 controls the degree of amplification of the intensity changing portion 3A according to the detection results. As for the operation of the intensity changing portion 3A, the same operation as that of the intensity changing portion 3 according to the thirteenth embodiment may be adopted.

Thus, in the case of detecting that the watermark indicating the one-generation duplication permission is embedded, the electronic watermark embedding apparatus 100C re-marks the watermark indicating the prohibition of the duplication in the image contents. At this time, it changes the intensity of the watermark according to the detection results of actually detecting the embedded watermark, and so it can control the intensity of the watermark so as to be securely detected without unnecessarily increasing it.

In the case where the watermark indicating the one-generation duplication permission and the watermark indicating the prohibition of the duplication are not detected by the watermark detecting portion 20A, the contents are duplicable and so they are outputted as the MPEG stream without having the watermark re-marked by the addition portion 5A.

In the case where the watermark indicating the prohibition of the duplication is detected by the watermark detecting portion 20A, the control portion 12 exerts control to prohibit the recording.

Seventeenth Embodiment

Hereafter, a seventeenth embodiment of the electronic watermark embedding apparatus according to the present invention will be described by referring to FIG. 24.

Figure 24:
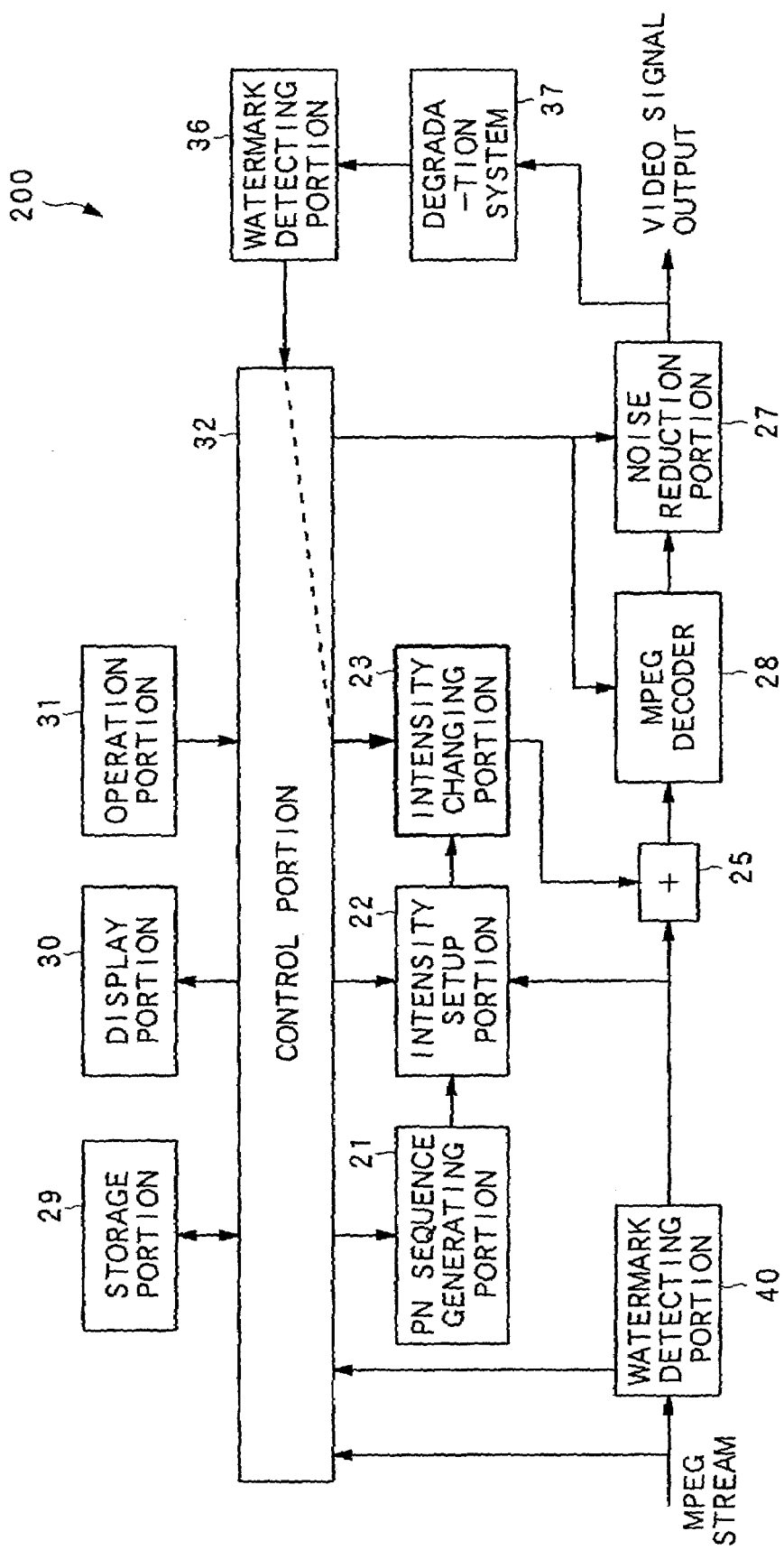
FIG. 24 is a block diagram showing the electronic watermark embedding apparatus according to a seventeenth embodiment.

FIG. 24 is a block diagram showing an electronic watermark embedding apparatus 200 according to the seventeenth embodiment. The electronic watermark embedding apparatus 200 re-embeds (re-marks) the watermark in the MPEG stream in which the watermark has already been embedded, and can be used as a part of the reproducing apparatus for reproducing the image contents MPEG-encoded and recorded on the record medium.

As shown in FIG. 24, the electronic watermark embedding apparatus 200 has a watermark detecting portion 40 for detecting the watermark from the inputted MPEG stream, a PN sequence generating portion 21 for generating the PN sequence constituting the watermark (electronic watermark), an intensity setup portion 22 for amplifying the PN sequence outputted from the PN sequence generating portion 21 and setting up the intensity thereof, an intensity changing portion 23 for changing the intensity of the PN sequence, an addition portion 25 for adding the inputted MPEG stream to the PN sequence, an MPEG decoder 28 for decoding the MPEG stream, a noise reduction portion 27 for reducing the noise of the video signal outputted from the MPEG decoder 28, a storage portion 29 having the RAM and ROM, a display portion 30 for presenting the predetermined information to the operator, an operation portion 31 for receiving the operation of the operator, and a control apparatus 32 for controlling the above portions.

The electronic watermark embedding apparatus 200 has a degradation system 37 for receiving the video signal to which the PN sequence is added outputted from the noise reduction portion 27 and the watermark detecting portion 36 for receiving an output signal of the degradation system 37. The watermark is detected by the watermark detecting portion 36, and the detection results of the watermark are sent to the control portion 32.

A degradation system 37 supports signal processing in a recording apparatus for recording a contents image based on the video signal outputted from the noise reduction portion 27, and the position of the watermark detecting portion 36 is corresponding to the position for detecting the watermark on recording the contents. Therefore, the configuration of the degradation system 37 should be a circuit for supporting the processing in the recording apparatus. To be more specific, the circuit of the degradation system 37 can be exemplified by the MPEG encoder, a combination of the MPEG encoder and MPEG decoder, a combination of the MPEG encoder, MPEG decoder and the noise reduction circuit or an analog/digital conversion circuit and so on.

The electronic watermark embedding apparatus 200 can process the video signal in the degradation system 37 so as to generate the signal to which the degradation of the watermark assumed on recording on the recording apparatus is added. And it has the configuration wherein the watermark detecting portion 36 detects the watermark based on the signal generated through these processes, and it can thereby obtain a detection state approximate to the detection state of the watermark on the actual recording. Therefore, it is possible to precisely conform the detection results of the watermark of the watermark detecting portion 36 to the detection results of the watermark on the recording so as to precisely control the intensity of the watermark.

The electronic watermark embedding apparatus 200 detects the watermark based on the signal having gone through the degradation system 37. It is also possible, however, for the watermark detecting portion 36 to directly detect the watermark based on the video signal outputted from the noise reduction portion 27.

Before recording a received MPEG stream on the record medium such as the optical disk, the watermark detecting portion 40 detects whether or not the watermark is embedded in the MPEG stream and which of the one-generation duplication permission and the prohibition of the duplication is indicated by the watermark embedded in the video signal so as to output the detection results to the control portion 32.

In the case where the watermark indicating the one-generation duplication permission is detected by the watermark detecting portion 40, a PN sequence generating portion 21 generates the PN sequence corresponding to the prohibition of the duplication. The intensity of the PN sequence is set up by the intensity setup portion 22 as with the thirteenth embodiment, and the intensity is further changed by the intensity changing portion 23. The PN sequence outputted from the intensity changing portion 23 is added to the MPEG stream by the addition portion 25.

An intensity changing portion 23 is controlled by the control portion 32 to change the intensity of the PN sequence outputted from the intensity setup portion 22 according to the detection results of the watermark of the watermark detecting portion 36. To be more specific, on receiving the detection results of the watermark from the watermark detecting portion 36, the control portion 32 controls the degree of amplification of the intensity changing portion 23 according to the detection results. As for the operation of the intensity changing portion 23, the same operation as that of the intensity changing portion 3 according to the thirteenth embodiment may be adopted.

Thus, in the case of detecting that the watermark indicating the one-generation duplication permission is embedded, the electronic watermark embedding apparatus 200 re-marks the watermark indicating the prohibition of the duplication in the image contents. At this time, it changes the intensity of the watermark according to the detection results of actually detecting the embedded watermark, and so it can control the intensity of the watermark so as to be securely detected without unnecessarily increasing it.

In the case where the watermark indicating the one-generation duplication permission and the watermark indicating the prohibition of the duplication are not detected by the watermark detecting portion 40, the contents are duplicable and so they are outputted as the video signal without having the watermark re-marked by the addition portion 25.

In the case where the watermark indicating the prohibition of the duplication is detected by the watermark detecting portion 40, the control portion 32 exerts control to prohibit the recording.

Eighteenth Embodiment

Hereafter, a sixth embodiment of the electronic watermark embedding apparatus according to the present invention will be described by referring to FIG. 25.

FIG. 25 is a block diagram showing an electronic watermark embedding apparatus 200A according to the eighteenth embodiment. The electronic watermark embedding apparatus 200A re-embeds (re-marks) the watermark in the video signal in which the watermark has already been embedded, and can be used as a part of the reproducing apparatus for reproducing the image contents MPEG-encoded and recorded on the record medium as with the electronic watermark embedding apparatus 200.

As shown in FIG. 25, the electronic watermark embedding apparatus 200A has the PN sequence generating portion 21 for generating the PN sequence constituting the watermark (electronic watermark), an intensity setup portion 22A for amplifying the PN sequence outputted from the PN sequence generating portion 21 and setting up the intensity thereof, an intensity changing portion 23A for changing the intensity of the PN sequence, the MPEG decoder 28 for decoding the inputted MPEG stream, the noise reduction portion 27 for reducing the noise of the video signal outputted from the MPEG decoder 28, a watermark detecting portion 40A for detecting the watermark from the video signal outputted from the noise reduction portion 27, an addition portion 25A for adding the video signal outputted from the noise reduction portion 27 to the PN sequence, the storage portion 29 having the RAM and ROM, the display portion 30 for presenting the predetermined information to the operator, the operation portion 31 for receiving the operation of the operator, and control apparatus 32 for controlling the above portions.

The electronic watermark embedding apparatus 200A has a degradation system 37 for receiving the MPEG stream to which the PN sequence is added outputted from the addition portion 25A and the watermark detecting portion 36 for receiving an output signal of the degradation system 37. The watermark is detected by the watermark detecting portion 36, and the detection results of the watermark are sent to the control portion 32.

The degradation system 37 is the portion equivalent to the degradation system 37 in the electronic watermark embedding apparatus 200 according to the fifth embodiment. As for the configuration of the degradation system 37, the same configuration as that of the seventeenth embodiment may be adopted.

It is also possible, by omitting the degradation system 37, for the watermark detecting portion 36 to directly detect the watermark based on the video signal outputted from the noise reduction portion 27.

The watermark detecting portion 40A detects whether or not the watermark is embedded in the video signal and which of the one-generation duplication permission and the prohibition of the duplication is indicated by the watermark embedded in the MPEG stream so as to output the detection results to the control portion 32.

In the case where the watermark indicating the one-generation duplication permission is detected by the watermark detecting portion 40A, a PN sequence generating portion 21 generates the PN sequence corresponding to the prohibition of the duplication. The intensity of the PN sequence is set up by the intensity setup portion 22A as with the intensity setup portion 2 of the thirteenth embodiment, and the intensity is further changed by the intensity changing portion 23A. The PN sequence outputted from the intensity changing portion 23A is added to the video signal by the addition portion 25A.

An intensity changing portion 23A is controlled by the control portion 32 to change the intensity of the PN sequence outputted from the intensity setup portion 22A according to the detection results of the watermark of the watermark detecting portion 36. To be more specific, on receiving the detection results of the watermark from the watermark detecting portion 36, the control portion 32 controls the degree of amplification of the intensity changing portion 23A according to the detection results. As for the operation of the intensity changing portion 23A, the same operation as that of the intensity changing portion 3 according to the thirteenth embodiment may be adopted.

Thus, in the case of detecting that the watermark indicating the one-generation duplication permission is embedded, the electronic watermark embedding apparatus 200A re-marks the watermark indicating the prohibition of the duplication in the image contents. At this time, it changes the intensity of the watermark according to the detection results of actually detecting the embedded watermark, and so it can control the intensity of the watermark so as to be securely detected without unnecessarily increasing it.

In the case where the watermark indicating the one-generation duplication permission and the watermark indicating the prohibition of the duplication are not detected by the watermark detecting portion 40A, the contents are duplicable and so they are outputted as the MPEG stream without having the watermark re-marked by the addition portion 25A.

In the case where the watermark indicating the prohibition of the duplication is detected by the watermark detecting portion 40A, the control portion 32 exerts control to prohibit the recording.

The above-mentioned embodiments have the configuration wherein the PN sequence constituting the watermark is added to the luminance values set up for the respective pixels. However, the present invention is not limited thereto, and it is also possible to add the PN sequence constituting the watermark to other values set up for the respective pixels.

The PN sequence constituting the watermark is not limited to the M sequence. Another random sequence such as Gold symbols may be used as the PN sequence constituting the watermark.

The embodiments took the case of constituting the watermark by the PN sequence as an example. However, the present invention is not limited thereto. For instance, it is also possible to constitute the watermark by the random or nearly random symbols or other signals in which the symbols having regularity not easily determinable are arranged.

The embodiments took the case of associating the symbols constituting the PN sequence with the pixels of the image one-on-one as an example. However, the present invention is not limited thereto. For instance, it is also possible to divide the image into a plurality of areas comprised of a plurality of mutually adjacent pixels and associate the symbols constituting the PN sequence with the areas one-on-one. Here, an example is taken as to the case of embedding the PN sequence "0101 . . . " constituting the watermark indicating the prohibition of the duplication into the image divided into square areas comprised of four mutually connected pixels. In this case, "0" is added to the luminance values of all the four pixels included in the area placed first in the image. Furthermore, "1" is added to the luminance values of all the four pixels included in the area placed second in the image. In this way, the symbols constituting the PN sequence are associated with the areas comprised of the plurality of pixels one-on-one so that the watermark can remain in the digital image even if the digital image is filtered or compressed.

It is a matter of course that the present invention is applicable to package media such as the video tape or DVD other than broadcasting media.

The entire disclosure of Japanese Patent Application No. 2002-107916 filed on Apr. 10, 2002, No. 2002-139933 filed on May 15, 2002, No. 2002-142009 filed on May 16, 2002 and No. 2002-150224 filed on May 24, 2002 including the specification, claims, drawings and summary is incorporated herein by reference in its entirety.

What is claimed is:

1. An electronic watermark embedding apparatus, comprising:
    a first embedding device for embedding an electronic watermark comprised of a signal generated based on a predetermined rule into contents comprised of digital information;
    a variation device for varying intensity of the electronic watermark to be embedded into the contents; and
    a controlling device for controlling the variation device so as to change the intensity of the electronic watermark
    a detection device for detecting a first electronic watermark embedded in the contents, and
    a second embedding device for embedding a second electronic watermark into the contents according to detection results of the detection device, and
    a noise reduction device for reducing noise of a signal is placed more backward than the detection device and the second embedding device,
    wherein the detection device is placed more frontward than the second embedding device and the noise reduction device.

2. The electronic watermark embedding apparatus according to claim 1, further comprising
    a compression device for compression-encoding the signal is placed more backward than the detection device and the second embedding device.

3. The electronic watermark embedding apparatus according to claim 1, further comprising
a decoding device for decoding the signal is placed more backward than the detection device and the second embedding device.

4. The electronic watermark embedding apparatus according to claim 1, further comprising:
the second embedding device further for adding to the signal of the contents the electronic watermark having its intensity varied by the variation device and thereby generating a first signal; and
a detection device for detecting the electronic watermark embedded in the first signal by the embedding device:
and wherein the controlling device for controlling the variation device so as to vary the intensity of the electronic watermark according to detection results of the detection device.

5. The electronic watermark embedding apparatus according to claim 4, wherein, in the case where the intensity of the electronic watermark detected by the detection device is low, the controlling device controls the variation device to have the intensity increased thereby.

6. The electronic watermark embedding apparatus according to claim 4, wherein, in the case where the intensity of the electronic watermark detected by the detection device is high, the controlling device controls the variation device to have the intensity decreased thereby.

7. The electronic watermark embedding apparatus according to claim 4, further comprising
a signal processing device for processing the first signal and generating a second signal, and wherein:
the detection device detects the electronic watermark embedded in the first signal by the second embedding device based on the second signal.

8. The electronic watermark embedding apparatus according to claim 1, further comprising
a compression device for compression-encoding the signal is placed more frontward than the detection device and the second embedding device.

9. An electronic watermark embedding apparatus, comprising:
an embedding device for embedding an electronic watermark comprised of a signal generated based on a predetermined rule into contents comprised of digital information;
a variation device for varying intensity of the electronic watermark to be embedded into the contents;
a controlling device for controlling the variation device so as to change the intensity of the electronic watermark; and
a noise reduction device for performing a noise reduction process to the information of the contents;
wherein the controlling device controls the variation device so as to change the intensity of the electronic watermark in conjunction with the intensity of the noise reduction process by the noise reduction device.

10. The electronic watermark embedding apparatus according to claim 9, wherein the controlling device controls the variation device so as to increase the intensity of the electronic watermark when the intensity of the noise reduction process by the noise reduction device is high.

11. The electronic watermark embedding apparatus according to claim 9, wherein the variation device comprises:
a setup device for setting up the intensity of the electronic watermark based on an information signal of the contents; and
a changing device for changing the intensity of the electronic watermark set up by the setup device in conjunction with the intensity of the noise reduction process by the noise reduction device.

12. The electronic watermark embedding apparatus according to claim 9, wherein the controlling device controls the variation device so as to increase the intensity of the electronic watermark by having a spacing.

13. The electronic watermark embedding apparatus according to claim 9, comprising
a detection device for detecting whether or not a first electronic watermark is embedded in the contents in advance and, in the case where the first electronic watermark is embedded, detecting a type thereof, and wherein:
the controlling device exerts control so as to embed a new second electronic watermark based on detection results from the detection device.

14. The electronic watermark embedding apparatus according to claim 9, further comprising:
a compression device for compression-encoding the information of the contents;
and wherein the controlling device for controlling the variation device so as to change the intensity of the electronic watermark in conjunction with compression ratio of the compression process by the compression device.

15. The electronic watermark embedding apparatus according to claim 14, wherein the controlling device controls the variation device so as to increase the intensity of the electronic watermark when the compression ratio of the compression process by the compression device is high.

16. The electronic watermark embedding apparatus according to claim 14, wherein the variation device comprises:
a setup device for setting up the intensity of the electronic watermark based on an information signal of the contents; and
a changing device for changing the intensity of the electronic watermark set up by the setup device in conjunction with the compression ratio of the compression process by the compression device.

17. The electronic watermark embedding apparatus according to claim 14, wherein the controlling device controls the variation device so as to increase the intensity of the electronic watermark by having a spacing.

18. The electronic watermark embedding apparatus according to claim 14, comprising
a detection device for detecting whether or not a first electronic watermark is embedded in the contents in advance and, in the case where the first electronic watermark is embedded, detecting a type thereof, and wherein:
the controlling device exerts control so as to embed a new second electronic watermark based on detection results from the detection device.

19. An electronic watermark embedding apparatus comprising:
a first embedding device for embedding an electronic watermark comprised of a signal generated based on a predetermined rule into contents comprised of digital information;
a variation device for varying intensity of the electronic watermark to be embedded into the contents; and
a controlling device for controlling the variation device so as to change the intensity of the electronic watermark
a detection device for detecting a first electronic watermark embedded in the contents, and a second embedding device for embedding a second electronic watermark into the contents according to detection results of the detection device, and a noise reduction device for reducing noise of a signal is placed more frontward than the detection device and the second embedding device.

20. The electronic watermark embedding apparatus according to claim 19 further comprising:

the second embedding device further for adding to the signal of the contents the electronic watermark having its intensity varied by the variation device and thereby generating a first signal; and a detection device for detecting the electronic watermark embedded in the first signal by the embedding device:

and wherein the controlling device for controlling the variation device so as to vary the intensity of the electronic watermark according to detection results of the detection device.

21. An electronic watermark embedding apparatus comprising:

a first embedding device for embedding an electronic watermark comprised of a signal generated based on a predetermined rule into contents comprised of digital information;

a variation device for varying intensity of the electronic watermark to be embedded into the contents; and a controlling device for controlling the variation device so as to change the intensity of the electronic watermark a detection device for detecting a first electronic watermark embedded in the contents, and a second embedding device for embedding a second electronic watermark into the contents according to detection results of the detection device, and a noise reduction device for reducing noise of a signal is placed more backward than the detection device, wherein the detection device is placed more frontward than the second embedding device and the decoding device is placed more frontward than the detection device and the second embedding device.

* * * * *